(12) United States Patent
Bertotti et al.

(10) Patent No.: US 12,474,329 B2
(45) Date of Patent: Nov. 18, 2025

(54) IMMUNOASSAYS FOR HIGH POSITIVELY CHARGED PROTEINS

(71) Applicant: Ares Trading S.A., Aubonne (CH)

(72) Inventors: Elisa Bertotti, Strambino (IT); Valeria Castagna, Pavone Canavese (IT)

(73) Assignee: Ares Trading S.A., Aubonne (CH)

( * ) Notice: Subject to any disclaimer, the term of this patent is extended or adjusted under 35 U.S.C. 154(b) by 0 days.

(21) Appl. No.: 18/164,275

(22) Filed: Feb. 3, 2023

(65) Prior Publication Data

US 2023/0408529 A1 Dec. 21, 2023

Related U.S. Application Data

(63) Continuation of application No. 15/547,080, filed as application No. PCT/EP2016/051808 on Jan. 28, 2016, now abandoned.

(30) Foreign Application Priority Data

Jan. 29, 2015 (EP) .................................... 15153117

(51) Int. Cl.
| | | |
|---|---|---|
| G01N 33/53 | (2006.01) | |
| C12Q 1/40 | (2006.01) | |
| G01N 33/543 | (2006.01) | |
| G01N 33/68 | (2006.01) | |
| G01N 35/00 | (2006.01) | |
| G01N 35/10 | (2006.01) | |

(52) U.S. Cl.
CPC .......... *G01N 33/5306* (2013.01); *C12Q 1/40* (2013.01); *G01N 33/54306* (2013.01); *G01N 33/54393* (2013.01); *G01N 33/6887* (2013.01); *G01N 35/0099* (2013.01); *G01N 35/10* (2013.01); *G01N 35/1095* (2013.01); *G01N 2035/00495* (2013.01); *G01N 2333/50* (2013.01); *G01N 2800/102* (2013.01)

(58) Field of Classification Search
CPC .............. G01N 33/6887; G01N 33/48; G01N 33/5306; G01N 33/54306; G01N 33/54393; G01N 35/0099; G01N 35/10; G01N 35/1095; G01N 2035/00495; G01N 2333/50; G01N 2800/102; C12Q 1/40
See application file for complete search history.

(56) References Cited

U.S. PATENT DOCUMENTS

| | | | |
|---|---|---|---|
| 8,207,115 B2 | 6/2012 | Gimona et al. | |
| 9,326,944 B2 | 5/2016 | Cerreti et al. | |
| 9,724,388 B2 | 8/2017 | Ladel et al. | |
| 9,795,714 B2 | 10/2017 | Canal et al. | |
| 9,889,179 B2 | 2/2018 | Ladel et al. | |
| 10,086,112 B2 | 10/2018 | Ladel et al. | |
| 10,221,456 B2 | 3/2019 | Ladel et al. | |
| 10,293,051 B2 | 5/2019 | Lo Presti et al. | |
| 11,467,169 B2 | 10/2022 | Ladel et al. | |
| 11,513,128 B2 | 11/2022 | Ladel et al. | |
| 2012/0171723 A1 | 7/2012 | Deisher et al. | |
| 2018/0024142 A1 | 1/2018 | Bertotti et al. | |

FOREIGN PATENT DOCUMENTS

| | | |
|---|---|---|
| WO | WO-2005/095457 A2 | 10/2005 |
| WO | WO-2008/157161 A1 | 12/2008 |
| WO | WO-2011/028945 A1 | 3/2011 |
| WO | WO-2012/172072 A1 | 12/2012 |
| WO | WO-2014/023704 A1 | 2/2014 |
| WO | WO-2015/097233 A1 | 7/2015 |
| WO | WO-2015/097236 A2 | 7/2015 |
| WO | WO-2015/124731 A1 | 8/2015 |
| WO | WO-2015/124735 A1 | 8/2015 |
| WO | WO-2015/124739 A1 | 8/2015 |
| WO | WO-2016/120387 A1 | 8/2016 |

OTHER PUBLICATIONS

Cheng, X. et al., Raman-based identification of crystals in Synovial samples from patients with Gouty Symptoms, 1 page, (2009), retrieved from the internet at http://www.ors.org/Transactions/55/2119.pdf.
EMD Millipore, Regeneration and Cleaning of Eshmuno HCX Chromatography Resin—A Screening Study, 8 pages, (2013).
Gryolab™ assay development guide, 1 page, (2014).
International Search Report for PCT/EP2016/051808, 5 pages (mailed Mar. 11, 2016).
Jayadev, C. et al., Hyaluronidase treatment of synovial fluid to improve assay precision for biomarker research using multiplex immunoassay platforms, J. Immunol., Methods, 386(1-2):22-30 (2012).
Mora, J.R. et al., Application of the Gyrolab™ platform to ligand-binding assays: a user's perspective, Bioanalysis, 2(10):1711-1715 (2010).
Moreno, M.J. et al., Processing of noninflammatory synovial fluids with hyaluronidase for cytospin preparations improves the accuracy of differential counts, Diagn. Cytopathol., 22(4):256-258 (2000).
Roman, J. et al., Application of miniaturized immunoassays to discovery pharmacokinetic bioanalysis, J. Pharmacol. Toxicol. Methods, 63(3):227-235 (2011).
Written Opinion for PCT/EP2016/051808, 6 pages (mailed Mar. 11, 2016).

*Primary Examiner* — Gailene Gabel

(74) *Attorney, Agent, or Firm* — Choate, Hall & Stewart LLP; Michael A. Shinall; Stephany Foster

(57) ABSTRACT

The present invention relates to immunoassays for quantification of a high positively charged protein, such as a FGF-18 protein, in human synovial fluid sample.

9 Claims, 6 Drawing Sheets
Specification includes a Sequence Listing.

IMMUNOASSAYS FOR HIGH POSITIVELY CHARGED PROTEINS

CROSS-REFERENCE TO RELATED APPLICATIONS

The present application is a continuation application of U.S. patent application Ser. No. 15/547,080, filed, Jul. 28, 2017, now abandoned, which is a U.S. national stage application of International Patent Application No. PCT/EP16/51808, filed Jan. 28, 2016, which claims the benefit of European Patent Application No. 15153117.5, filed Jan. 29, 2015, the disclosures of which are incorporated herein by reference in their entirety.

SEQUENCE LISTING

The present application contains a Sequence Listing with two sequences, which has been submitted electronically through USPTO Patent Center in XML format and is hereby incorporated by reference in its entirety. Said XML copy, created on May 24, 2023, is named HLB-M-USC1 Sequence Listing.xml and is 4,096 bytes in size.

FIELD OF THE INVENTION

The present invention relates to immunoassays for evaluating affinity of an antibody for FGF-18 protein and for quantification of FGF-18 protein in human synovial fluid sample.

BACKGROUND OF THE INVENTION

Immunoassays are biochemical tests that exploit the ability of antibodies to specifically bind a molecule among a complex mixture (e.g. biological matrix). This ability can be used to detect or quantify the recognized molecule, the so-called analyte, or vice versa, i.e. the antigen can be used to capture and allow quantification of a specific antibody. The binding event is associated to the generation of a measurable signal, which is usually compared to the signal generated by a reference sample at a known concentration. The first immunoassays were all based on the labelling of antibodies with radioactive iodine (RadioImmunoAssays, RIA). In the '60s there were the first experiments with enzyme based immunoassays (EnzymeImmunoAssays EIA, or Enzyme Linked ImmunoSorbent Assay, ELISA), that have become the most popular during the years. Nowadays there are several kinds of labels that can be used, from enzymes to fluorescent probes, DNA, etc. Moreover unlabelled reagents can be used.

Different immunoassays technologies are currently used, such as AlphaLISA Technology, GYROLAB Technology and Imperacer Technology.

The GYROLAB immunoassay platform is a microfluidics-based automated system, composed by a liquid handling system, a fluorescence detection system and compact disc (CD) microlaboratory. The immunoassay is performed on affinity capture columns embedded in microstructures into the CD. There are different kinds of CDs, allowing the processing of different analyte volumes, in order to have different performances in terms of dynamic range, sensitivity and type of assay. In a CD there are from 12 to 14 segments, each segment is made up by 8 microstructures. Each microstructure contains a complex system of nanofluidics, that allows the passage of reagents, wash buffers and analytes, and ends with the affinity column, prepacked with streptavidine beads. The immunoassay takes place by using the centrifugal force generated by the CD rotation: the common reagents are dispensed by the liquid handling system in a common channel (one for each segment) while samples are deposited in an individual inlet to avoid cross-contamination. A slow rotation of the CD allows the volume definition by eliminating the extra-volume using the overflow channel: a hydrophobic barrier prevents the passage of the fluid to the column. After volume definition a faster rotation of the CD allows the breakage of the hydrophobic barrier, and the liquid can flow through the column. The first reagent must be labelled with biotin, in order to bind to the streptavidine beads. At the end of the immunoassay (for example a secondary Ab in a sandwich immunoassay) a reagent labelled with a fluorescence probe is added. A laser inside the workstation is able to excite the fluorophore and then the fluorescence response is read. Between the different steps of reagents addition there are several washing steps that make the immunoassay more specific. The instrument has pre-determined protocols, but many parameters can be varied (composition of the wash buffers, number of washing steps, length of CD spinning) to optimize a method in order to obtain the best results. Different immunoassay formats (sandwich, direct, indirect, competitive and bridging) can be set up. The only requirement is the availability of a biotinilated and a fluorescence probe labelled reagent.

SUMMARY OF THE INVENTION

In one aspect the invention provides a method for pre-treating a human synovial fluid sample for immunoassay comprising
  adding hyaluronidase solution to the human synovial fluid sample,
  incubating said sample at room temperature (RT),
  centrifuging the human synovial fluid sample.

In another aspect the invention provides a method for quantification of a high positively charged protein in a human synovial fluid sample comprising the steps of
  a) pre-treating the human synovial fluid sample, the pre-treating step comprising
    adding hyaluronidase solution to the human synovial fluid sample,
    incubating said sample at room temperature (RT),
    centrifuging the human synovial fluid sample,
  b) diluting the pre-treated human synovial fluid sample with a buffer,
  c) immobilizing a biotinylated antibody against the high positively charged protein to a column,
  d) washing the column to remove unbound antibody with a standard wash buffer,
  e) contacting in the column the pre-treated and diluted human synovial fluid sample with the immobilized biotinylated antibody under conditions in which the antibody binds specifically to the high positively charged protein, to produce an antibody-protein complex,
  f) washing the column complex with a standard wash buffer;
  g) adding to the antibody-protein complex in the column a fluorescent dye labelled antibody specific for the high positively charged protein to produce a measurable response, and washing the column with a standard wash buffer,
  h) measuring the response produced, i) determining a quantity of high positively charged protein in the sample by comparing the response produced with the sample to the response produced with a calibration standard.

In a further aspect the invention provides a method for automatic quantification of a high positively charged protein in a human synovial fluid sample comprising the steps of
a) pre-treating the human synovial fluid sample, the pre-treating step comprising
adding hyaluronidase solution to the human synovial fluid sample,
incubating said sample at room temperature (RT),
centrifuging the human synovial fluid sample,
b) diluting the pre-treated human synovial fluid sample with a buffer,
c) immobilizing a biotinylated antibody against the high positively charged protein to a column,
d) washing the column to remove unbound antibody with a standard wash buffer,
e) providing a injection means for automatic transfer of the pre-treated and diluted human synovial fluid sample to the column,
f) washing the injection means with a high ionic force buffer before the pre-treated and diluted human synovial fluid sample transferring to the column,
g) transferring the pre-treated and diluted human synovial fluid sample to the column, thereby contacting the pre-treated and diluted human synovial fluid sample with the immobilized biotinylated antibody under conditions in which the antibody binds specifically to the high positively charged protein, to produce an antibody-protein complex,
h) washing the injection means with a high ionic force buffer after the step g)
i) washing the column with a standard wash buffer;
j) adding to the antibody-protein complex in the column a fluorescent dye labelled antibody specific for the high positively charged protein to produce a measurable response, and washing the column a standard wash buffer,
k) measuring the response produced,
l) determining a quantity of the high positively charged protein in the sample by comparing the response produced with the sample to the response produced with a calibration standard.

DETAILED DESCRIPTION OF THE INVENTION

Figure 1:
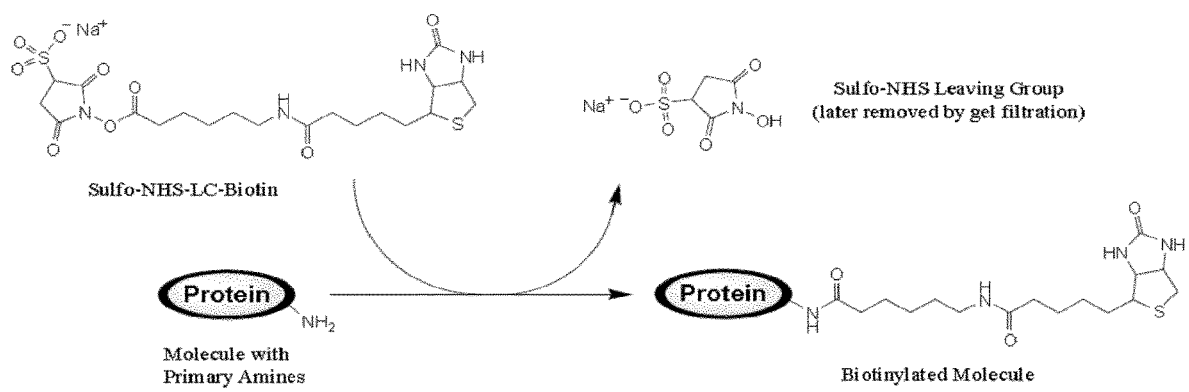
FIG. 1 shows reaction of Sulfo-NHS-LC-Biotin with primary amine. Note that NHS is a leaving group (byproduct) in the reaction. The leaving group and any non-reacted biotin reagent are removed during the desalting step.

All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control.

Unless defined otherwise, all technical and scientific terms used herein have the same meaning as is commonly understood by one of skill in art to which the subject matter herein belongs. As used herein, the following definitions are supplied in order to facilitate the understanding of the present invention.

The term "comprise" is generally used in the sense of include, that is to say permitting the presence of one or more features or components.

As used in the specification and claims, the singular form "a", "an" and "the" include plural references unless the context clearly dictates otherwise.

The term "FGF-18 compound", "FGF-18 protein" or "FGF-18", as used herein, is intended to be a protein maintaining at least one biological activity of the human FGF-18 protein. FGF-18 may be native, in its mature form, a recombinant form or a truncated form thereof. Biological activities of the human FGF-18 protein include notably the increase in chondrocyte or osteoblast proliferation (see WO98/16644) or in cartilage formation (see WO2008/023063). Native, or wild-type, human FGF-18 is a protein expressed by chondrocytes of articular cartilage. Human FGF-18 was first designated zFGF-5 and is fully described in WO98/16644. SEQ ID NO:1 corresponds to the amino acid sequence of the native human FGF-18, with a signal peptide consisting of amino acid residues 1(Met) to 27(Ala). The mature form of human FGF-18 corresponds to the amino acid sequence from residue 28(Glu) to residue 207 (Ala) of SEQ ID NO: 1 (180 amino acids). FGF-18, in the present invention, may be produced by recombinant method, such as taught by the application WO2006/063362. Depending on the expression systems and conditions, FGF-18 in the present invention is expressed in a recombinant host cell with a starting Methionine (Met) residue or with a signal sequence for secretion. When expressed in prokaryotic host, such as in *E. coli*, FGF-18 contains an additional Met residue in N-terminal of its sequence. For instance, the amino acid sequence of human FGF-18, when expressed in *E. coli*, starts with a Met residue in N-term (position 1) followed by residues 28 (Glu) to residue 207 (Ala) of SEQ ID NO: 1.

The term "truncated form" of FGF18, as used herein, refers to a protein which comprises or consists of residues 28(Glu) to 196(Lys) of SEQ ID NO: 1. Preferably, the truncated form of FGF-18 protein is the polypeptide designated "trFGF-18" (170 amino acids; also known as rhFGF18 or sprifermin), which starts with a Met residue (in N-terminal) followed by amino acid residues 28 (Glu) –196 (Lys) of the wild-type human FGF-18. The amino acid sequence of trFGF-18 is shown in SEQ ID NO:2 (amino acid residues 2 to 170 of SEQ ID NO:2 correspond to amino acid residues 28 to 196 of SEQ ID NO:1). trFGF-18 is a recombinant truncated form of human FGF-18, produced in *E. coli* (see WO2006/063362). trFGF-18 has been shown to display similar activities as the mature human FGF-18, e.g. it increases chondrocyte proliferation and cartilage deposition leading to repair and reconstruction for a variety of cartilaginous tissues (see WO2008/023063).

The term "positively charged" refers to protein that contain more positively charged basic amino acids (such as lysine, arginine and histidine) than negatively charged acidic amino acids and/or are folded so that positively charged amino acids are exposed on their surface and/or exhibit an overall positive charge at the pH of the medium (when the pH of said medium is lower than the pI, ie isoelectric point). These proteins are usually basic (pI usually higher than 7). The term "high positively charged protein" refers to proteins being very basic, i.e having a high pI, preferably at about or above 9.5. Lysozyme, FGF-2 and FGF-18 for instance, are basic proteins, highly positively charged. This term is well within the knowledge of the skilled person.

The term "room temperature" refers to a temperature usually in the range of at or about 15 to 25° C., such as at or about 15° C., 18° C., 20° C., 22° C. or 25° C.

According to the project phase different types of methods are needed, for example in the early phases only a quick and dirty evaluation is required, or a method can be qualified. For GLP and clinical studies methods need to be validated. Moreover not in every case the evaluation of immunogenicity is required.

Measurement of drug concentrations (PK) and anti-drug antibody (ADA) in biological matrices is an important aspect of drug development. The results of toxicokinetic, pharmacokinetic and bioequivalence studies are used to make critical decisions supporting the safety and efficacy of a medicinal drug. It is therefore vital that the applied bioanalytical methods used are well characterized, fully validated and documented to a satisfactory standard in order to yield reliable results. Non-clinical (pharmaco-toxicological) studies submitted in a marketing authorization application must be carried out in conformity with the Good Laboratory Practice. Methods used in non-GLP pre-clinical studies should be qualified but not necessarily developed in a GLP facility and fully validated. Human bioanalytical studies fall outside of the scope of GLP, as defined in Directive 2004/10/EC, while the principles of Good Clinical Practice (GCP) should be followed. The regulatory authorities (FDA, EMA) issued official guidelines describing validation of PK and ADA assay that must be followed in order to assure reliability of the data produced using a validated method. Moreover, white papers written by the scientific community are covering new topics that arise in the field between different editions of the official guidelines. An assay life cycle can be categorized into 3 general phases: method development, pre-study validation, and in-study validation. During method development, an assay concept is evaluated, which will be confirmed during the pre-study validation phase, and applied during the in-study validation phase. The pre-study validation phase takes place after the method optimization is concluded and the assay is considered performant: this means that the critical assay reagents should be identified and produced if necessary. Based on the available reagents the most appropriate technology is chosen, the assay format and the batch size are defined. The Minimum Required Dilution (MRD) is selected to minimize matrix effect and the method range is defined and sensitivity is confirmed. Standard curve concentrations and a regression model for fitting a curve to calibration data should be established during method development. Before starting with the experimental phase a validation plan must be produced. The documentation should include a description of the intended use of the method and a summary of the performance parameters to be validated, a summary of the proposed experiments and the target acceptance criteria for each performance parameter evaluated. After completion of the validation exercise, a comprehensive report must be produced. The report summarizes the assay performance results and any other relevant information related to the conditions under which the assay can be used without infringing the acceptance criteria. The main characteristics of a bioanalytical method that are essential to ensure the acceptability of the performance and the reliability of analytical results are: selectivity, lower limit of quantitation, method range, the response function (calibration curve performance), accuracy, precision, matrix effects, stability of the analyte in the biological matrix and the stock and working solutions under the entire period of storage and processing conditions.

Immunoassays for the quantification of drug or anti-drug antibodies rely closely on the quality of the antibodies used. This means that one can use different technologies and formats, but the starting point must always be a good antibody pair. The role of antibodies in an immunoassay generally includes capture and detection reagents for PK assays and positive controls for immunogenicity assays. When several types of assay formats and reagents are considered for the same application, it is advisable to initiate the generation of the different types of reagents in parallel, increasing the likelihood of obtaining optimal reagents with the appropriate and pre-specified characteristics. Conducting an appropriate risk assessment provides an opportunity to adequately balance resources and timelines. The best strategy is to consider the objectives of the study in question, the stage of the drug development program, potential assay formats, species of origin and type of matrices of samples to be tested, required assay sensitivity and specificity, as well as the potential need for reagent reactivity to multiple analytes. Examples of useful information to be collected include: (a) the requirements for sensitivity as well as specific and selective interactions between a reagent and the target analyte; (b) the need to reduce potential non-specific interactions with other assay components, such as heterophilic antibodies and their interactions in PK assays (c) the need to reduce potential cross-reactivity in the target sample population (e.g., rheumatoid factor); (d) the need for discrimination between analyte isoforms and its proteolytic byproducts; (e) the requirement for detecting free analytes versus those in larger complexes; and (f) detecting anti-drug antibodies bound to the therapeutic with or without treatment of the sample with acid. Each assay requires different antibodies types: for examples during early MAb therapeutic discovery programs, generic anti-IgG reagents may be used, which may later become less desirable as target-specific reagents are generated.

Whatever the technology used, without a good raw material, especially antibodies, the goodness of the assay can be impacted. For this reason, to better select the antibodies of interest, affinity determination using GYROLAB and epitope mapping using the CLIPS technology were explored. The evaluation of the new technologies was conducted taking into consideration the phase of the project trying to implement the good platform to use based on the specific needs (e.g. required sensitivity, flexibility, ease of transfer).

GYROLAB was chosen to develop a PK method to quantify a highly positively charged drug, such as a FGF-18 protein, preferably sprifermin, in human synovial fluid. Two difficulties were encountered during method development: high isoelectrical point of the analyte (a drug) and high viscosity of the matrix (the sample). The challenge was to find a way (type of buffer for analytic dilution, washing procedure, etc) to help reducing issues related to sickness of the molecule and a sample pre-treatment able to fluidify the matrix without compromising the analyte stability. Determination of antibodies affinity can have a great value for a better comprehension of the best format to be used, or to understand possible pitfalls when developing new immunoassays. In a biological interaction, there are two partners: the one with the lower molecular weight is usually called the ligand (L), and the macromolecular binding partner is called the receptor (R). In the immunocomplexes, the antibody is considered as the receptor, while the analyte is considered the ligand. In solution, the total concentration of a receptor is made up by the fraction of receptor free and the ligand-bound (assuming that the receptor has a single binding site for the ligand, so that any molecule is either free or bound). As well, any ligand molecule must be either free or bound to a receptor molecule. This leads to these mass conservation equations:

$[R]=[RL]+[R]_f$ $[L]=[RL]+[L]_f$

Where [R] and [L] are total concentrations of receptor and ligand respectively, $[R]_f$ and $[L]_f$ are the free concentrations of the two molecules, and [RL] is the concentration of the receptor-ligand complex.

In this system, there will be a continuous passage of molecules from the free to the bound state.

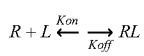

Where the $k_{on}$ is the second-order rate constant for complex association and the the $K_{off}$ is the first-order rate constant for complex dissociation.

When the rate of association and dissociation of the complex become to be equal, the equilibrium is reached. The position of this equilibrium is quantified in terms of dissociation constant $K_d$:

$$K_d = \frac{[R]_f[L]_f}{[RL]} = \frac{1}{K_a} = \frac{K_{off}}{K_{on}}$$

The relative affinities of different receptor-ligand complexes are inversely proportional to their $K_d$ values, so the strength of binding to the same molecule can be compared using the $K_d$ value for different binding partners. The association constant $(K_a)$ is the inverse of the $K_d$.

In most of the cases, the affinity between a receptor and a ligand is such that a large excess of ligand is required to effect significant binding to the receptor; thus under most experimental conditions, the formation of the binary complex proceeds with little change in the concentration of free ligand. Thus the association reaction proceeds with pseudo-first-order kinetics:

$[RL]_t=[RL]_{eq}[1-\exp(-k_{obs}t)]$

Where $[RL]_t$ is the concentration of the binary complex RL at the time t, $[RL]_{eq}$ is the concentration of the binary complex at the equilibrium, and $k_{obs}$ is the experimentally determined value for the pseudo-first-order rate constant for approach to equilibrium.

For reversible binding, the value of Kobs is directly proportional to the concentration of the ligand:

$k_{obs}=k_{off}+k_{on}[L]_f$

Therefore, one can determine the value of $k_{obs}$ at different ligand concentrations. By plotting $k_{obs}$ as function of ligand concentration a linear fit with slope equal to $k_{on}$ and intercept equal to $k_{off}$ is obtained.

The most common and easy way to study receptor-ligand interactions is to wait after equilibrium has been established, since these kinetics usually occur in a very short time.

At the equilibrium the concentration of the RL complex is constant, and the rate of complex association and dissociation is equal.

$$K_d = \frac{[R]_f[L]_f}{[RL]} = \frac{K_{off}}{K_{on}} \frac{d[RL]}{dt} = k_{on}[R]_f[L]_f,$$

$$\frac{-d[RL]}{dt} = k_{off}[RL]k_{on}[R]_f[L]_f = k_{off}[RL],$$

$$[RL] = \frac{K_{on}}{K_{off}}[R]_f[L]_f$$

Considering that $k_{on}/k_{off}$ is equivalent to the association constant $K_a$:

$[RL]=K_a[R]_f[L]_f$

There are various techniques that are currently used for the affinity measurement; the most employed in literature are Isothermal Titration Calorimetry (ITC), Surface Plasmon Resonance (SPR) and KinExA.

GYROLAB technology was used to evaluate the affinity of an antibody for its antigen. This technology is based on the competition of the immobilized antigen for the binding to the antibody of interest with increasing amounts of free antigen at the equilibrium. Only the antibody not bound to the free antigen in solution is captured by the immobilized antigen, allowing the determination of its concentration using a fluorophore (i.e. a fluorescent dye) for the detection. According to the developed procedure, the steps required for the determination of the affinity are:

Biotinilation of the antigen and labeling of the antibody with a fluorescent dye, for instance Alexa-647,
Investigations on the capture conditions,
Determination of the fixed Ab concentration,
Determination of the binding equilibrium time,
Confirmation of the obtained KD: repetitions and variation in Ab concentration.

Since the labelling of the reagents is a crucial step, the capture reagent (sprifermin) was labelled with different ratios of biotin and used to capture the antibody in comparison with the unlabelled antigen. Sprifermin is a highly positively charged protein, therefore a high a specific binding of the analyte to the column (for example CD column of GYROLAB technology) was observed. In order to reduce this effect, a modified method with more stringent washing steps was employed successfully. The chosen capturing reagent was sprifermin labelled with 1:2 to 1:20 ratio of biotin (such as 1:2, 1:10 or 1:20), preferably 1:5 to 1:15 ratio of biotin or even preferably 1:10 ratio of biotin. Once the capture reagent was established (sprifermin labelled preferably at 1:10), it was used to determine the fixed antibody (Ab) concentration: a standard curve of both the antibodies under evaluation was analysed without pre-mixing them with the free antigen. The choice of the best concentration was based on two factors: the chosen concentration must have lied on the linear part of the curve and the response must have been enough high to allow enough room for signal reduction with the increase of antigen concentration in the pre-mix. Two antibodies against FGF-18 have been used: F05 and F44. Once labelled with the fluorescent dye, both labelled antibodies were used at a concentration ranged from 0.1 pM to 100 nM, such as for instance 0.1 or 0.5 pM, 0.001, 0.005, 0.01, 0.05, 0.1, 0.5, 1.5, 10, 50 or 100 nM. Preferably, the concentration is ranged from 0.05 to 1 nM. The even preferred concentration resulted to be at or about 0.1 nM. The two mAbs at the selected concentration were incubated with different amounts of antigen (spanning from 0.5 pM to 2 µM) for 1 hour (1 h) or 24 hour (24 h). The responses obtained after 1 h and 24 h of incubation were very similar, therefore the calculated $K_D$ was comparable for the two mAbs. Arguing that equilibrium was already reached at this time, all the following experiments were performed with a pre-mixing of 1 hour, a favourable condition in order to speed up the entire development. These preliminary data were also useful for the first $K_D$ estimation. $K_D$ of the F05 mAb resulted to be around 1 nM, while the mAb F44 seemed to have higher affinity with an estimated $K_D$ of around 200 pM. To have a good calculation of the $K_D$, a $K_D$ controlled experiment was performed and the condition to be satisfied was: the ratio between fixed mAb concentration and the calculated $K_D$ should have been less or equal to 1. In both cases this requirement was fulfilled; the ratio for F05 was around 0.09 and for F44 was around 0.2, abundantly below 1.

These experiments were confirmed by repeating 4 times the assessment using the developed procedure also changing the fixed mAb concentration. F05 gave robust results, with stable responses and conserving the estimated affinity constant around 1 nM for all the experiments performed in a $K_D$ controlled fashion. The F44 showed a higher affinity than F05, being around 300 pM, but results were less reproducible, suggesting that this behaviour can be due to the reagents used: with a higher affinity antibody the determination is more challenging.

The second aspect addressed to evaluate quality of the antibodies was the epitope mapping. Since these antibodies are used in a sandwich immunoassay, the recognized epitopes can be a useful information not only to select the best pair of antibodies but also for data interpretation. By knowing the exact epitopes recognized by the antibody, it is possible to evaluate the ability of the assay to specifically recognize the intact drug or digested products, information very useful for PK data interpretation during drug development. Epitope mapping was performed according to Pepscan Presto (The Neederland). This technology was chosen for its ability to recognize not only linear epitopes as the most conventional techniques but also conformational and discontinues epitopes in a short time. The antigen (sprifermin) was converted in a library of around 4000 overlapping peptides that were tested as such and with single residue mutagenesis. Moreover they were conformed in loops using the CLIPS technology: as such, with mutagenesis and finally with the juxtaposition of sequences coming from all the protein length. All these sets of peptides were tested in a Pepscan-based ELISA optimized ad hoc for the binding properties of the antibodies used. Data analysis was challenging because the two antibodies showed very similar binding patterns, but since they are used in a sandwich ELISA, there should necessarily be a difference in the two epitopes. Therefore, the binding patterns were analysed in comparison by highlighting differentially binding peptides. A common binding region was found (amino acid residues 21-27 of SEQ ID NO.2). In addition a second binding region (amino acid residues 7-21 of SEQ ID NO.2 for F05 and 153-164 of SEQ ID NO.2 for F44) was found for both mAbs. These regions are respectively at the N-term and C-term domain of the protein primary sequence and, based on the tertiary structure of a protein with high homology of sprifermin, they should be in proximity of the region of amino acid residues 21-27 of SEQ ID NO.2.

Two antibodies, F05 and F44, were used to develop a PK assay to quantify sprifermin in human synovial fluid. Since the matrix showed a very high interference and the volume of samples collected from patients could be very limited, GYROLAB was chosen as preferred technology with respect to the sandwich ELISA already validated to quantify the same drug in human serum. The antibody couple was tested in both combinations of capture and detection, resulting that F44 could be used as capture reagent while F05 as detection reagent. This behaviour confirms the major affinity measured for F44: in fact the most affine Ab is normally used to capture an analyte in a complex matrix.

An important aspect inventors had to take into account was the analyte. Sprifermin is a recombinant protein of around 20 kDa characterized by an isoelectrical point of 10.4. That means that at a neutral pH the protein is positively charged. As a consequence, it is sticky and has the tendency to bind to the glass and plastic surfaces. Therefore, the buffer for sample dilution was optimized to avoid loss of analyte during sample handling. Different buffers have been tested: REXXIP HN, REXXIP HN Max, Diluent buffer 1 and Diluent buffer 10. Among these buffers, the one with the best performances was the REXXIP HN (a buffer developed for positively charged analytes).

The second issue related to this method development was the complexity of the matrix. Unspiked synovial fluid, as well as spiked with the analyte, were diluted using different MRDs to find the optimal dilution. During the experiments conducted to find the best MRD, inventors experienced that synovial fluid is highly viscous and difficult to be handled. Moreover a strange behaviour in term of response in the assay was observed: the lower dilution, the better result in term of CV % and % BIAS. For these reasons it was decided to improve the handling of synovial fluid by adding a pre-treatment procedure. Digestion with hyaluronidase was assessed, as synovial fluid is made in particular of hyaluronic acid. Mild conditions in terms of temperature and duration were applied to reduce impact of the treatment on analyte stability. After several trials, inventors realized that hyaluronidase digestion of synovial fluid alone was not enough to reduce sample viscosity; needle clotting, contamination of other samples, bad % CV and bad % BIAS were observed in many experiments performed varying hyaluronidase concentration and incubation time. Therefore, to improve the performance of the method, a step of centrifugation was tested in combination with hyaluronidase digestion providing good results in terms of % BIAS and % CV without impacting the analyte stability. The final sample pre-treatment procedure was set up (centrifugation twice at 13,000 rpm for 5 minutes and incubation for 30' at RT in shaking with 20 µg/mL of hyaluronidase) improving handling of the samples, increasing matrix fluidity and avoiding needle clotting phenomena. After having established dilution buffer, MRD and sample pretreatment, to ensure that the analyte doesn't really bind to the instrument, needles carry-over assessment was performed. As expected, Sprifermin still showed high binding to the GYROLAB needles (due to its high positive charge) even if REXXIP HN was used, impacting on low concentrated Spiked Sample (SS). Therefore the method was modified by adding additional washing steps with a high salt solution before analyte addition step. The method thus comprises at least 2 wash steps: one before analyte addition step and one after said analyte addition step.

In a further aspect the invention provides a method for pre-treating a human synovial fluid sample for immunoassay comprising adding hyaluronidase solution to the human synovial fluid sample,
    incubating said sample at room temperature (RT)
    centrifuging the human synovial fluid sample The hyaluronidase concentration is ranged from 0.1 to 30 µg/mL, such as 0.1, 1, 5, 10, 15, 20, 25 or 30 µg/mL. Preferably, it is ranged from 5 to 20 µg/mL. Even preferably it is at or around 20 µg/mL.

The incubation time of the human synovial fluid with the hyaluronidase is at least 20 minutes, preferably at least 25 minutes and even preferably at least 30 minutes. More preferably, the time of incubation of the human synovial fluid with the hyaluronidase is 30 minutes or 1 hour.

Centrifugation of the human synovial fluid sample is performed according to standard methods. For instance, the centrifugation can be performed from 10,000 to 15,000 rpm, such as at or about 13,000 rpm for 5 to 15 minutes, preferably 10 minutes.

In another aspect the invention provides a method for quantification of a high positively charged protein in a human synovial fluid sample comprising the steps of a) pre-treating the human synovial fluid sample, the pre-treating step comprising
    adding hyaluronidase solution to the human synovial fluid sample,
    incubating said sample at room temperature (RT)
    centrifuging the human synovial fluid sample
b) diluting the pre-treated human synovial fluid sample with a buffer,
c) immobilizing a biotinylated antibody against the high positively charged protein to a column,
d) washing the column to remove unbound antibody with a standard wash buffer,
e) contacting in the column the pre-treated and diluted human synovial fluid sample with the immobilized biotinylated antibody under conditions in which the antibody binds specifically to the high positively charged protein, to produce an antibody-protein complex,
f) washing the column complex with a standard wash buffer;
g) adding to the antibody-protein complex in the column a fluorescent dye labelled antibody specific for the high positively charged protein to produce a measurable response, and washing the column with a standard wash buffer,
h) measuring the response produced,
i) determining a quantity of high positively charged protein in the sample by comparing the response produced with the sample to the response produced with a calibration standard.

In further aspect the invention provides a method for automatic quantification of a high positively charged protein in a human synovial fluid sample comprising the steps of a) pre-treating the human synovial fluid sample, the pre-treating step comprising
    adding hyaluronidase solution to the human synovial fluid sample,
    incubating said sample at room temperature (RT)
    centrifuging the human synovial fluid sample
b) diluting the pre-treated human synovial fluid sample with a buffer,
c) immobilizing a biotinylated antibody against the high positively charged protein to a column,
d) washing the column to remove unbound antibody with a standard wash buffer,
e) providing an injection means for automatic transfer of the pre-treated and diluted human synovial fluid sample to the column,
f) washing the injection means with a high ionic force buffer before the pre-treated and diluted human synovial fluid sample transferring to the column,
g) transferring the pre-treated and diluted human synovial fluid sample to the column, thereby contacting the pre-treated and diluted human synovial fluid sample with the immobilized biotinylated antibody under conditions in which the antibody binds specifically to the high positively charged protein, to produce an antibody-protein complex,
h) washing the injection means with a high ionic force buffer after the step g)
i) washing the column with a standard wash buffer;
j) adding to the antibody-protein complex in the column a fluorescent dye labelled antibody specific for the high positively charged protein to produce a measurable response, and washing the column a standard wash buffer,
k) measuring the response produced,
l) determining a quantity of the high positively charged protein in the sample by comparing the response produced with the sample to the response produced with a calibration standard.

According to invention, the term "high positively charged protein" refers to proteins that contain more positively charged basic amino acids (such as lysine, arginine and histidine) than negatively charged acidic amino acids and/or are folded so that positively charged amino acids are exposed on their surface and/or exhibit an overall positive charge at the pH of the medium. Preferably, the high positively charged protein is an FGF-18 protein. More preferably, the FGF-18 protein is selected from the group consisting of: 1) a polypeptide comprising or consisting of the mature form of human FGF-18, corresponding to the sequence comprising or consisting of residue 28(Glu) to residue 207(Ala) of SEQ ID NO: 1, 2) a polypeptide comprising or consisting of a truncated form of human FGF-18 comprising or consisting of residue 28 (Glu) to residue 196 (Lys) of SEQ ID NO:1, and 3) a polypeptide comprising or consisting of SEQ ID NO:2. More preferably, FGF-18 is sprifermin.

In a further embodiment, the pre-treated human synovial fluid sample is diluted 1:2 to 1:10, preferably at or about 1:5, with REXXIP HN buffer (above step b)).

In another embodiment the high ionic force buffer is a buffer containing a high concentration of salt such as NaCl, preferably in alcohol. Preferably the salt concentration is at least 1M. For instance, the high ionic force buffer is 1.5M NaCl in 20% ethanol.

Centrifugation of the human synovial fluid sample (step a)) is performed according to standard methods. For instance, the centrifugation can be performed from 10,000 to 15,000 rpm, such as at or about 13,000 rpm for 5 to 15 minutes, preferably 10 minutes.

The incubation time of the human synovial fluid with the hyaluronidase (step a)) is at least 20 minutes, preferably at least 25 minutes and even preferably at least 30 minutes. More preferably, the time of incubation of the human synovial fluid with the hyaluronidase is 30 minutes or 1 hour. The hyaluronidase concentration is ranged from 0.1 to 30 µg/mL, such as 0.1, 1, 5, 10, 15, 20, 25 or 30 µg/mL. Preferably, it is ranged from 5 to 20 µg/mL. Even preferably it is at or around 20 µg/mL.

In an embodiment, the standard wash buffer can be any known standard buffer. It is for instance a Tween buffer, such as 0.05% Tween 20 in PBS.

An antibody against high positively charged protein, such as against FGF-18 protein (i.e. an antibody that specifically binds to for example FGF-18 protein) can be obtain by any standard methods known in the art.

A column used in the methods of invention is any suitable column known in the art for separating biochemical mixtures based on a highly specific interaction such as that between antigen and antibody. Preferably, the column is an affinity capture column. More preferably, the column is a streptavidin-bead column.

Washing steps of the column are always done to remove unbound reagents (antibodies, mixture or proteins). Washing steps of the injection means are always done to remove sticky high positively charged protein, such as FGF-18 protein, which can cause carry over in the run, when several samples have to be quantified.

An injection means used in the methods of invention is any suitable injection device for transferring liquid samples from one vessel to another vessel, for example for transferring the pre-treated and diluted human synovial fluid sample from dilution vessel to the column. The injection means can be disposable or non-disposable. For instance, such suitable injection device can be a pipetting system with a disposable tip or a needle adapted for the methods of invention. Specifically such a needle can be a needle used in GYRO-LAB workstation (GYROLAB immunoassay platform).

In the frame of automatic quantification, a set of samples can be quantified simultaneously, or nearly simultaneously. In such a case, a set of columns will be needed, one per human synovial fluid sample to be analysed, and each step of the method will be repeated. Usually, the same injection mean can be used to transfer the sample on the column, as long as all the washing steps are carefully performed to avoid carry over between samples. Should a disposable injection device being used, the wash steps of steps f) and h) are not necessary.

As used herein, fluorescent dyes are organic colouring agents that are able to absorb ultraviolet radiation or visible light and emit it as light of longer wavelength with virtually no time delay (fluorescent). Fluorescent dyes within the scope of this invention are both dye molecules and chromophoric constituents (fluorochromes) of larger molecular units, for example chromophores bound to antibodies or other biomolecules. Such fluorescent dyes for example acridine dyes, cyanine dyes, fluorone dyes, oxazine dyes, phenanthridine dyes, rhodamine dyes and are used in for example fluorescence analysis and as fluorescent probes for specific labelling in immunology. A good overview of common fluorescent dyes and their fields of use is known to the person skilled in the art from, for example, the Handbook of Fluorescent Probes and Research Chemicals, Richard P. Haugland, Molecular Probes.

In a preferred embodiment, Alexa-647 fluorescent dye is used. This fluorescent dye belongs to the Alexa Fluor family of fluorescent dyes and is produced by Molecular Probes, Inc. The excitation and emission spectra of the Alexa Fluor series cover the visible spectrum and extend into the infrared. The individual members of the family are numbered according roughly to their excitation maxima (in nm). Alexa Fluor dyes are synthesized through sulfonation of coumarin, rhodamine, xanthene (such as fluorescein), and cyanine dyes. Sulfonation makes Alexa Fluor dyes negatively charged and hydrophilic. Alexa Fluor dyes are generally more stable, brighter, and less pH-sensitive than common dyes (e.g. fluorescein, rhodamine) of comparable excitation and emission, and to some extent the newer cyanine series.

In the context of the present invention, a measurable response is fluorescence emitted by labelled compounds (antibody or protein) and measured by any fluorometry or spectrofluorometry methods known in the art. When GYRO-LAB technology is used, the fluorescence signal emitted is measured by the GYROLAB workstation, which is able to perform a scanning of the column surface, giving as a result a numeric response of Relative Fluoresce Unit, and an image of the peak of fluorescence into the column.

Those skilled in the art will appreciate that the invention described herein is susceptible to variations and modifications other than those specifically described. It is to be understood that the invention includes all such variations and modifications without departing from the spirit or essential characteristics thereof. The invention also includes all of the steps, features, compositions and compounds referred to or indicated in this specification, individually or collectively, and any and all combinations or any two or more of said steps or features. The present disclosure is therefore to be considered as in all aspects illustrated and not restrictive, the scope of the invention being indicated by the appended Claims, and all changes which come within the meaning and range of equivalency are intended to be embraced therein.

The foregoing description will be more fully understood with reference to the following Examples. Such Examples, are, however, exemplary of methods of practising the present invention and are not intended to limit the scope of the invention.

Description of the Sequences:
- SEQ ID NO.1: Amino acid sequence of the native human FGF-18.
- SEQ ID NO.2: Amino acid sequence of the recombinant truncated FGF-18 (trFGF-18).

EXAMPLES

In the following examples, if an actual sample concentration is below the lower limit of quantitation of the method (150 pg/mL), it will be reported as below lower limit of quantitation (BQL).

1. Affinity Measurement Using GYROLAB Technology 1.1.1. Analysis Method

For the affinity measurement a direct antibody assay was used. The antigen, Sprifermin, labelled with biotin, is attached to the CD column, and the alexa647-labelled mAb is captured by the immobilized antigen. A pre-mixing step of the antigen and antibody, performed outside the CD, in a microplate well is required. After a defined time the mixture is loaded, and only the free antibody is captured by the immobilized antigen. The analysed antibodies are monoclonal antibodies (IgG) produced against Sprifermin by Zymogenetics and used for the cre-clinical and clinical PK assay. The antibodies are identified as F5A2 (referred in the text as mAb F05) and F44A2 (referred in the text as mAb F44).

1.1.2. Sprifermin Biotinilation

For biotinilation the kit Pierce "EZ-Link Micro Sulfo-NHS-LC-Biotinylation: no-weight biotin" (cat. 21327) was used. The biotinilated product was purified using Pierce "Zeba Desalt Spin Columns" (cat. 89849), while the degree of labelling was checked by using the kit from Pierce "Biotin quantitation kit" (cat. 25008). N-Hydroxysuccinimide (NHS) esters of biotin are the most popular type of biotinylation reagents. NHS-activated biotins react efficiently with primary amino groups (—NH2) in pH 7-9 buffers to form stable amide bonds. Proteins typically have many sites for labelling (see FIG. 1), including the primary amine in the side chain of lysine (K) residues and the N-terminus of each polypeptide. Several different NHS esters of biotin are available with varying properties and spacer arm lengths. The sulfo-NHS ester reagent in this kit is water-soluble, enabling reactions to be performed in the absence of organic solvents. Because biotin is small (244 Da), it can be conjugated to many proteins without altering their biological activities.

The biotination was performed according to this procedure:
1. 200 µL of cold Milli-Q water were added to 1 mg of biotin to obtain a concentration of 9 mM;
2. The Sprifermin was brought to a concentration of 0.1 mM (corresponding to 2 mg/mL: molecular weight 19830). A 2/10/20 fold molar excess of biotin over the analyte is used. Therefore, 2.7/13.5/27 µl of 9 mM biotin is added to 120 µl Sprifermin;
3. The mixture was incubated for 1 h in shaking condition;
4. Excess of biotin was removed with a Zeba Desalt Spin Column from Pierce. This column is able to exchange buffer in which the protein is dissolved with ≥95% retention of salts and small molecules while providing recovery of proteins greater than 7,000 Da. First a column was centrifuged for 1 minute at 1500×g. The excess of liquid was removed and 120 µL of sample was loaded. The column was centrifuged for 2 minutes at 1500×g. The flowthrough contains the labelled protein without free biotin.
5. The sample concentration was measured by spectrometry by reading at 280 nm with Nanodrop ND-1000. PBS was used as reference.

After biotinilation the labelling degree was checked by using the Pierce Biotin Quantitation Kit. HABA (4'-hydroxyazobenzene-2-carboxylic acid) is a reagent that enables a quick estimation of the mole-to-mole ratio of biotin to protein. The kit contains a premix of HABA and avidin and a biotinylated horseradish peroxidase (HRP) positive control: the HABA/Avidin.

The solution containing the biotinylated protein was added to a mixture of HABA and avidin. Because of its higher affinity for avidin, biotin displaces the HABA and the absorbance at 500 nm decreases proportionately. By this method, an unknown amount of biotin present in a solution can be quantified in a single microplate well by measuring the absorbance of the HABA-avidin solution before and after addition of the biotin-containing sample. The change in absorbance relates to the amount of biotin in the sample by the extinction coefficient of the HABA-avidin complex.

The following procedure was applied:
1. No-Weigh HABA/Avidin Premix was equilibrated to room temperature and dissolved in 100 µL of milliQ water;
2. 160 µl of PBS was pipetted in a microplate well for each sample plus one for the positive control;
3. 20 µl of the HABA/Avidin Premix solution was added to the PBS in each well. The microplate was placed on an orbital shaker to mix for 2 minutes;
4. Absorbance of the solution in the well at 500 nm was measured and the value was recorded as A500 HABA/avidin;
5. 20 µl of biotinylated sample/Biotinylated HRP (positive control with know biotinilation rate) were added to the well containing the HABA/avidin reaction mixture and mixed as described above;
6. The absorbance of the solution in the well was read at 500 nm and the value was recorded as A500 HABA/avidin/biotin sample once the value remains constant for at least 15 seconds;
7. Finally the milliMoles of Biotin per milliMole of Protein (in the original sample) was calculated according to the following formulas:

mmol of biotinilated protein per mL =

$$\frac{\text{protein conc. (mg/mL)}}{MW \text{ of protein (mg/mmol)}} = Calc\#1$$

$$\Delta A_{500} = (A_{500}H/A) - (A_{500}H\backslash A\backslash B) = Calc\#2$$

$$\frac{\text{mmol biotin}}{\text{mL reaction mixture}} = \frac{\Delta A_{500}}{34000 \times (\text{light path lenght cm})} = Calc\#3$$

$$\frac{\text{mmol biotin}}{\text{mmol protein}} = \frac{(Calc\#3) \times 10 \times \text{dilution factor}}{Calc\#\#1}$$

1.1.3 Alexa-Fluor 647 Labelling of the Antibodies

The kit from Molecular Probes "AlexaFluor® 647 Monoclonal Antibody Labeling Kit" (cat. A20186) was used to label and purify the product. Nanodrop 1000 was used to check the degree of labelling. Conjugates have absorption and fluorescence maxima of approximately 650 nm and 668 nm, respectively. The Alexa Fluor 647 reactive dye has a succinimidyl ester moiety that reacts efficiently with primary amines of proteins to form stable dye-protein conjugates. The labelling was performed according to this procedure:

1. The antibodies were diluted to the concentration of 1 mg/mL, and then one-tenth volume of Sodium Bicarbonate buffer (pH 8.3) was added. (Bicarbonate, pH ~8.3, is added to raise the pH of the reaction mixture, since succinimidyl esters react efficiently at pH 7.5-8.5);
2. 100 μL of the protein solution (from step 1) was transferred to the vial containing the reactive dye, and gently inverted to fully dissolve the dye;
3. The solution was incubated for 1 hour at 22° C. in shaking;
4. In order to separate the labelled antibody from the unreacted product, excess of dye was removed using a 30,000 MW size exclusion resin in phosphate-buffered saline (PBS), pH 7.2, plus 2 mM sodium azide. A spin column was placed in a 5 mL tube and the purification resin was stirred. 1 mL of the suspension was added into the column and allowed to settle. Then 500 μL were added. The total suspension volume is 1.5 mL. The column buffer was allowed to drain from the column by gravity. Initially, some pressure may be required to cause the first few drops of buffer to elute;
5. The spin column was placed in one collection tube and centrifuged for 3 minutes at 1100×g using a swinging bucket rotor. The buffer was discarded. The spin column is now ready for purifying the conjugated antibody;
6. The product from step 3 (labelling mixture) was added drop wise onto the centre of the spin column and allowed to absorb into the gel bed;
7. The spin column was place into the empty collection tube and centrifuged for 5 minutes at 1100×g;
8. After centrifugation, approximately 100 μL of labelled protein in PBS, pH 7.2, with 2 mM sodium azide was collected. Free dye remained in the column bed.

To quantitate the labelling ratio, the absorbance of the conjugate solution was read at both 280 nm and 650 nm using the Nanodrop instrument. The concentration of protein in the sample was calculated according to the following formula:

$$\text{Protein concentration } (M) = \frac{[A_{280} - (A_{650} \times 0.03)] \times \text{Dilution Factor}}{203'000}$$

where 203,000 is the molar extinction coefficient (E) in $cm^{-1}M^{-1}$ of a typical IgG at 280 nm, and 0.03 is a correction factor for the fluorophore's contribution to the absorbance at 280 nm.

The degree of labelling was calculated in this way:

$$\text{Moles of dye per moles of protein} = \frac{A_{650} \times \text{Dilution Factor}}{239'000 \times \text{Protein concentration } (M)}$$

where 239,000 $cm^{-1}M^{-1}$ is the approximate molar extinction coefficient of the Alexa Fluor 647 dye at 650 nm. For IgGs, the optimal labelling is between 3 and 7 moles of Alexa Fluor 647 dye per mole of antibody.

1.1.4. Capture Reagent Investigation

In order to determine the best experimental condition for the capture reagent (biotinilated Sprifermin), different conditions were tested in a 2-step GYROLAB assay. The biotinylated capturing reagent is bound to the beads creating analyte-specific capture columns. During the assay process, the alexa-647 labelled antibodies are passed through the columns, where the antibody is specifically captured.

The following capturing reagents were used:
Unlabelled Sprifermin alone;
Unlabelled Sprifermin+Biotinilated Bovine Serum Albumin (Bio-BSA, Sigma, A8549) ratio 1:3;
Unlabelled Sprifermin+Bio-BSA ratio 1:9;
Sprifermin, biotinilation labelling 1:2;
Sprifermin, biotinilation labelling 1:10;
Sprifermin, biotinilation labelling 1:20;

All the capturing reagents were brought to the concentration of 0.1 mg/mL in PBS-T (0.01% Tween 20 in Phosphate Buffered Saline) or in REXXIP HN buffer (Gyros, P0004996). The detection reagent (alexa-647 labelled mAb anti-sprifermin) was tested at the concentrations of 5, 10 and 50 nM diluted in REXXIP F buffer (Gyros, P0004825). The first experiment was performed using the GYROLAB method "Bioaffy 1000 2 step C-AD wiz-v1". The second experiment was performed using the GYROLAB method "Bioaffy 1000 wash x2 C-AD wiz-v1" with the addition of extra washing steps using Wash Solution 2 (WS2: 1.5M NaCl in 20% Ethanol).

Results

The first experiment to assess the best capture condition was performed by comparing three different degrees of biotinilated Sprifermin (ratio Sprifermin:biotin 1:2, 1:10, 1:20), and unlabelled Sprifermin as a negative control. The detection mAb under evaluation was prepared at three different concentrations. The results of the combination of the different capture conditions showed that there's a high unspecific signal due to the binding of the drug to the streptavidine-captured column (See Table 1, Sprifermin unlabelled).

TABLE 1

Results for the capture reagent investigation. First Experiment.

| Alexa 647 mAb (conc. nM) | Sprifermin biotinilation degree 1:2 AVG RLU | Sprifermin biotinilation degree 1:10 AVG RLU | Sprifermin biotinilation degree 1:20 AVG RLU | Sprifermin unlabelled AVG RLU |
|---|---|---|---|---|
| 0 | 0.237 | 0.012 | 0.033 | 0.006 |
| 5 | 678.3 | 71.7 | 11.8 | 72.6 |
| 10 | 686.7 | 80.9 | 13.3 | 106.2 |
| 50 | 710.3 | 135.4 | 16.5 | 150.3 |

AVG RLU: average response of three replicates.

In order to gain specificity, a change in the GYROLAB method was done. A washing step with a high ionic force buffer (WS2) was added to reduce the non-specific binding. The unlabelled Sprifermin was tested also in combination with Bio-BSA in order to block free binding sites of the column. Results of the second experiment are shown in Table 2.

TABLE 2

Results for the capture reagent investigation. Second Experiment.

| Alexa 647 mAb (conc. nM) | Sprifermin biotinilation degree 1:2 AVG RLU | Sprifermin biotinilation degree 1:10 AVG RLU | Sprifermin biotinilation degree 1:20 AVG RLU |
|---|---|---|---|
| 0 | 0.008 | 0.032 | −0.012 |
| 5 | 330.5 | 402.0 | 1.9 |

TABLE 2-continued

Results for the capture reagent investigation. Second Experiment.

| 10 | 308.0 | 485.0 | 2.2 |
| 50 | 751.7 | 534.0 | 2.7 |

| Alexa 647 mAb (conc. nM) | Sprifermin unlabelled AVG RLU | Sprifermin unlabelled + bio-BSA 1:3 AVG RLU | Sprifermin unlabelled + bio-BSA 1:9 AVG RLU |
| --- | --- | --- | --- |
| 0 | 0.005 | −0.004 | 0.002 |
| 5 | 5.8 | 6.2 | 4.3 |
| 10 | 9.6 | 11.4 | 5.8 |
| 50 | 14.4 | 20.0 | 8.5 |

AVG RLU: average response of three replicates

Using the new method, with WS2 washing steps, the specific signal due to the binding of bio-Sprifermin to the column is higher in relation to the signal of the unlabelled drug (at alexa labelled mAb concentration of 50 nM, with the first method the ratio between Sprifermin labelled 1:2 and Sprifermin unlabelled is around 5. In the second experiment the ratio is around 50). The responses of the unlabelled drug drastically decrease from experiment 1 to experiment 2, while the response of the labelled drug remains constant. The addition of Bio-BSA doesn't seem to help significantly the reduction of aspecific signal. By analysing the peaks of the different conditions, there's a clear difference among the signal generated by using labeled and unlabelled Sprifermin. The most interesting condition, in terms of peak shape and signal saturation, seems to be the Sprifermin biotinilation degree 1:10.

1.1.5. Fixed Antibody (Ab) Concentration Determination

In order to choose the fixed Alexa-647 labelled mAb concentration for the $K_D$ experiments, a standard curve spanning different concentrations of Alexa-647 labelled MAb was prepared without pre-incubation with the antigen. The different Ab concentrations were tested in a 2-step GYROLAB assay "Bioaffy 1000 wash x2 C-AD wiz-v1". The capture reagent, Bio-Sprifermin, labelling degree 1:10 was used at 0.1 mg/mL diluted in REXXIP HN. The standard curve was prepared by diluting Alexa-labelled mAb F05 at 50, 1, 0.1, 0.01, 0.005, 0.001 nM, 0.5 and 0.1 pM in REXXIP F. And Alexa-labelled mAb F44 at 50, 10, 1, 0.01, 0.005, 0.001 nM and 0.5 and 0.1 pM in REXXIP F.

Results

In order to establish the fixed mAbs concentrations to be used for the $K_D$ experiments, the two antibodies were prepared at different concentrations without pre-incubation with the drug. After a couple of experiments to determine the linear part of the sigmoidal curve, it seems that below 0.01 nM the responses are not stable for both antibodies showing quite similar behaviours (see Table 3). The % CV resulted very high up to 0.01 nM. The chosen concentration was 0.1 nM for both antibodies.

TABLE 3

Results for the F05 and F44 Fixed Ab concentration determination experiment.

| Ab Conc. (nM) | Alexa 647 lab. mAb F05 | | Alexa 647 lab. mAb F44 | |
| --- | --- | --- | --- | --- |
| | AVG RLU | % CV | AVG RLU | % CV |
| 0 | 1.687 | 140.3 | 2.601 | 88.9 |
| 0.0001 | 0.812 | 135.0 | 1.150 | 86.4 |
| 0.0005 | 0.456 | 121.1 | 1.077 | 77.4 |
| 0.001 | 0.355 | 107.8 | 1.226 | 64.1 |
| 0.005 | 0.616 | 54.7 | 2.217 | 37.8 |
| 0.01 | 1.1 | 22.1 | 3.9 | 36.2 |
| 0.1 | 8.8 | 2.3 | 40.0 | 4.7 |
| 1 | 69.5 | 1.9 | 483.0 | 7.9 |
| 10 | n.a. | n.a. | 735.0 | 1.9 |

AVG RLU: average response of three replicates,
CV%: % coefficient of variation of three replicates.
Underlined: % CV out of the acceptance criteria (±20%)

1.1.6. Equilibrium Time Determination and Evaluation Ration [Ab]/$K_D$

In order to choose the correct incubation time for the $K_D$ experiments, a standard curve spanning different concentrations of unlabelled Sprifermin was prepared and then incubated with the fixed alexa-647 labelled MAb for 1 h or 24 h and then tested. The standard curves were tested in a 2-step GYROLAB assay "Bioaffy 1000 wash x2 C-AD wiz-v1". The capture reagent, Bio-Sprifermin, labelling degree 1:10, was used at 0.1 mg/mL diluted in REXXIP HN. The standard curve was prepared by diluting unlabelled Sprifermin at a final concentration of 0.0005, 0.01, 0.05, 0.25, 0.5, 5, 50, 500, 1000 and 2000 nM. The dilution was a 1:20 performed in an Alexa-labelled mAb F05 at 0.1 nM, in REXXIP F. And Alexa-labelled mAb F44 at 0.1 or 0.05 nM in REXXIP F. These mixes were kept in shaking, in the dark for 1 h or 24 h at 22° C.

Results

Figure 2:
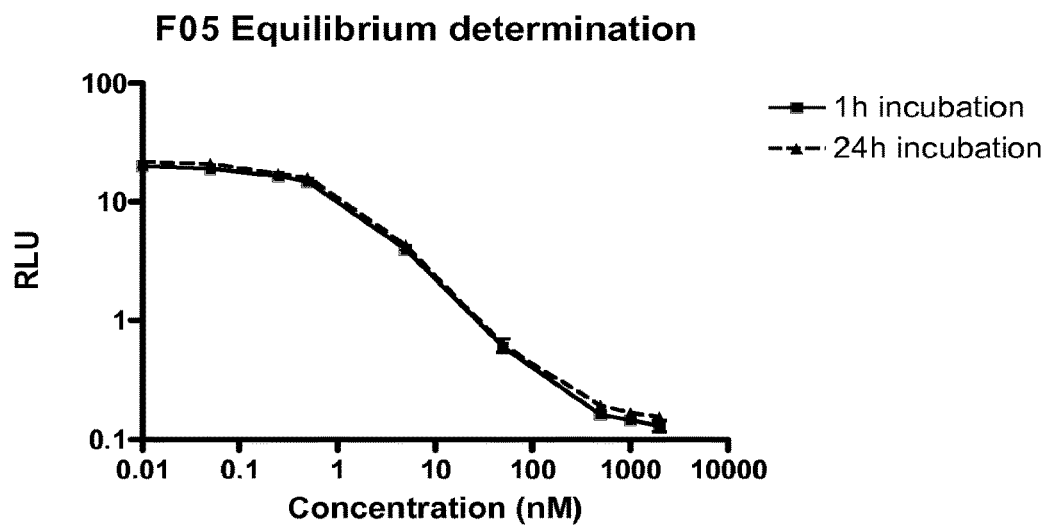
FIG. 2 shows graph of the log concentration of analyte vs RLUs obtained after combined incubation with alexa-647 labelled F05. Mean results of three replicates, error bars show SEM.

The chosen mAb concentration of 0.1 nM was pre-incubated with varying concentrations of Sprifermin in order to choose the preferred incubation time for $K_D$ determination. The pre-incubation was performed for 1 h or 24 h and then tested in order to assess if the shorter incubation was able to allow the equilibrium of the reaction (see FIG. 2 for the mAb F05 results).

Figure 3:
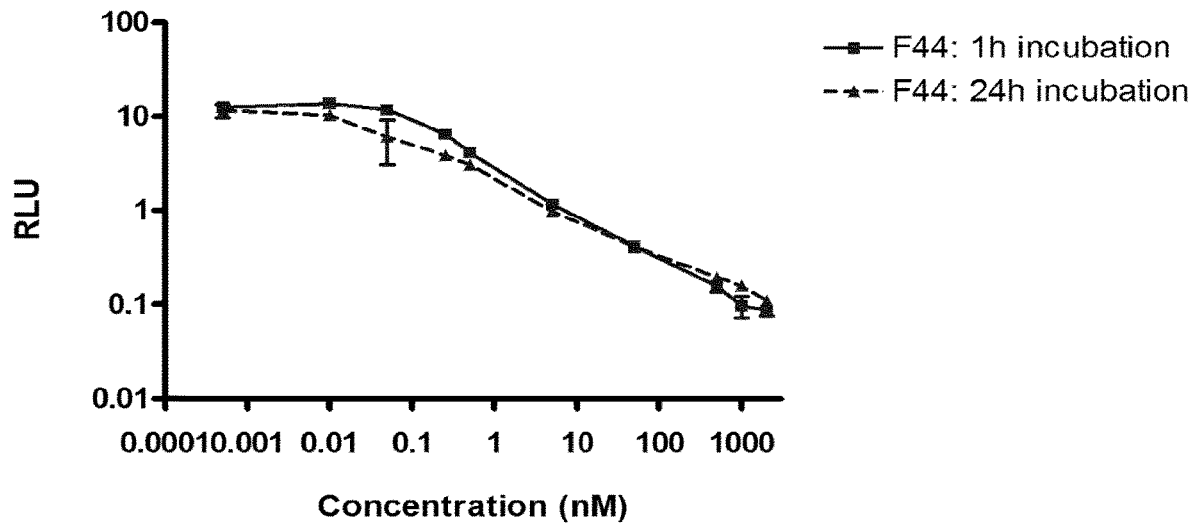
FIG. 3 shows graph of the log concentration of analyte vs RLUs obtained after combined incubation with alexa-647 labelled F44. Mean results of three replicates, error bars show SEM.

For the mAb F44 stable results were more difficult to obtain, therefore it was decided to decrease the fixed mAb concentration from 0.1 to 0.05 nM. The results in terms of % BIAS were not optimal, but were confirmed in many experiments. Since the calculated $K_D$ resulted to be similar after 1 and 24 h incubation, it was decided to keep the incubation time at 1 h (see FIG. 3 for the mAb F44). For both antibodies the ratio [Ab]/$K_D$ resulted to be abundantly below 1, so the experiment performed can be called $K_D$ controlled, allowing an accurate determination of the $K_D$.

1.1.7. Confirmation of the $K_D$

In order to confirm the obtained data, the determination of the $K_D$ was repeated 4 times for each antibody following the same procedure seen in 1.1.6.

Results

Figure 4:
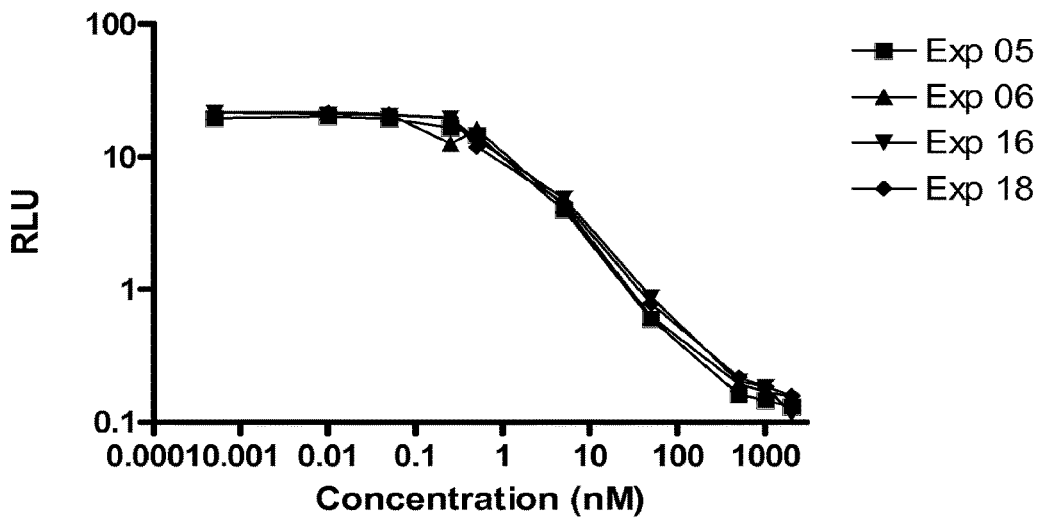
FIG. 4 shows graph of the log concentration of analyte vs average RLUs obtained after combined incubation with alexa-647 labelled mAb F05 in 4 independent experiments. Mean results of three replicates.
Figure 5:
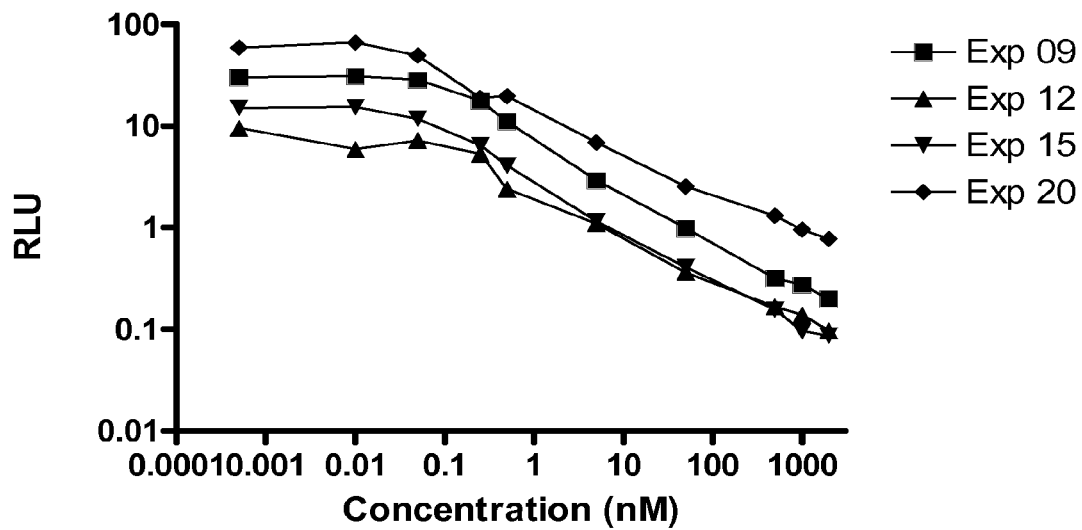
FIG. 5 shows graph of the log concentration of analyte vs average RLUs obtained after combined incubation with alexa-647 labelled F44 in 4 independent experiments. Mean results of three replicates.

KD experiments were repeated 4 times for each antibody in order to confirm the results. See FIG. 4 for mAb F05, see FIG. 5 for mAb F44. F05 gave robust results, the calculated $K_D$ is conserved in all the experiments and responses are stable. The calculated $K_D$ resulted to be around 1 nM. F44 resulted to be less reproducible, probably the reason is related to the low concentration of reagents used. mAb F44 shows however an higher affinity for Sprifermin than mAb F05, since the calculated $K_D$ is around 300 pM, and the high variation in the instrumental responses can be ascribed to the fact that this high affinity is probably a challenge for this technology.

1.1.8. $K_D$ Determination at Different Ab Fixed Concentrations

To establish the goodness of the calculated $K_D$S, unlabelled Sprifermin was incubated with various mAb concentrations. A standard curve spanning different concentrations of unlabelled Sprifermin was prepared and then incubated with 4 fixed alexa-647 labelled MAb for 1 h. The standard curves were tested in a 2-step GYROLAB assay "Bioaffy 1000 wash x2 C-AD wiz-v1".

The capture reagent, Bio-Sprifermin, labeling degree 1:10 was used at 0.1 mg/mL diluted in REXXIP HN. The standard curve was prepared by diluting unlabelled Sprifermin at a final concentration of 0.0005, 0.01, 0.05, 0.25, 0.5, 5, 50, 500, 1000 and 2000 nM. The dilution was a 1:20 performed in an Alexa-labelled mAb F05 at 0.01, 0.1, 1 and 10 nM, in REXXIP F. And Alexa-labelled mAb F44 at 5, 50 pM, 0.5 and 5 nM in REXXIP F. These dilutions were kept in shaking, in the dark for 1 h at 22° C.

Results

To confirm the reliability of the calculated $K_D$, the two mAbs were incubated at four different concentrations with unlabelled Sprifermin (as in previous experiments). This experiment was done in order to exclude that the obtained $K_D$ could be valid only for the chosen Ab concentration used in all the previous experiments. For the mAb F05, variations in the concentration had low impact on the calculated $K_D$. Only the highest concentration tested: 10 nM (100 times higher than the chosen 0.1 nM) showed a different result, but since the [Ab]/$K_D$ is 1.6 this determination can't be considered as accurate as the others (data not shown). The same happened also for the mAb F44 (data not shown). However the $K_D$ resulted to be higher than the one obtained in the previous experiment, confirming the hypothesis that the higher affinity of this antibody for its antigen is challenging for the GYROLAB technology.

2. Epitope Mapping Using Pepscan CLIPS Technology

The Pepscan CLIPS technology was used for the characterization of the two mAbs (F44 and F05) used for the PK immunoassay to quantify Sprifermin in serum and synovial fluid. The target drug was converted in a library of around 4000 overlapping peptide constructs, using a combinatorial matrix design. The CLIPS technology allows to structure peptides into single, double or triple loops. In this case single and double loops were tested. The synthesis was performed coupling CLIPS templates to cysteine residues in the peptides. Binding of the antibodies to each peptide was tested using a PEPSCAN-based ELISA. The peptide arrays were incubated with primary antibody solution overnight at 4° C. After washing, the peptide arrays were incubated with a 1:1000 dilution of an antibody peroxidase conjugate (SBA, cat. 2010-05) for 1 hour at 25° C. After washing, the peroxidase substrate 2,2'-azino-di-3-ethylbenzthiazoline (ABTS) and 2 µL/mL of 3% $H_2O_2$ were added. Colour development was measured after one hour and quantified with a CCD camera and an imaging processing system.

Six Different Sets of Peptides were Synthesized:

Set 1: Single residue mutagenesis scan: systematic replacement of a single position of a base sequence with any of the 19 natural amino acids (about 300 peptides);

Set 2: CLIPS conformational loops: Single-loop conformational CLIPS peptides, complete set of 20mers with an overlap of 19 residues (about 150 peptides);

Set 3: CLIPS conformational loops with mismatch disruptions: Identycal to set 2, but the 2 amino acids in the central position are substituted with Ala (about 150 peptides); Comparing Set 2 and 3 results can indicate the relevance of a mutated position.

Set 4: Linear: linear 20mers overlapping for 19 residues. (About 150 peptides);

Set 5: Linear with mismatch disruptions: Identycal to set 4, but the 2 amino acids in the central position are substituted with Ala (about 150 peptides);

Set 6: CLIPS discontinuous matrix: a matrix of 26×154 17mers with an overlap of 16 residues.

It is modelled on T3 CLIPS scaffold (about 4000 peptides); In order to optimize the binding conditions, an experimental design was performed with varying concentrations of the antibody, the composition of the diluent buffer and the array pre-treatment.

Results

In order to highlight the best binding peptides, a statistical tool that can be used is the box-plot method. The distribution of the results shows a common background level, and enables the determination of statistical outliers: peptides with a statistically relevant higher binding among the noise, which could indicate potential binding peptides. Using the box-plot analysis, the best conditions to highlight specific binding resulted to be antibody concentration at 5 µg/mL with 1% of competitive proteins in the blocking buffer.

Analysis of the linear and CLIPS peptides indicates that both antibodies have a similar binding pattern, with higher binding at the N- and C-term. Analysis of the discontinuous CLIPS matrix showed specific binding patterns for the 2 antibodies. The following amino acids numbering is based on SEQ ID NO.2. For both F05 and F44 the observed dominant binding regions were 21-27 and 36-45. Binding by F44 was also observed on regions 121-129, 141-151 and 153-163. These two regions also showed some binding for F05, but to a much lesser extent. F05 was shown to also bind to the N-terminal 1-21.

Figure 6:
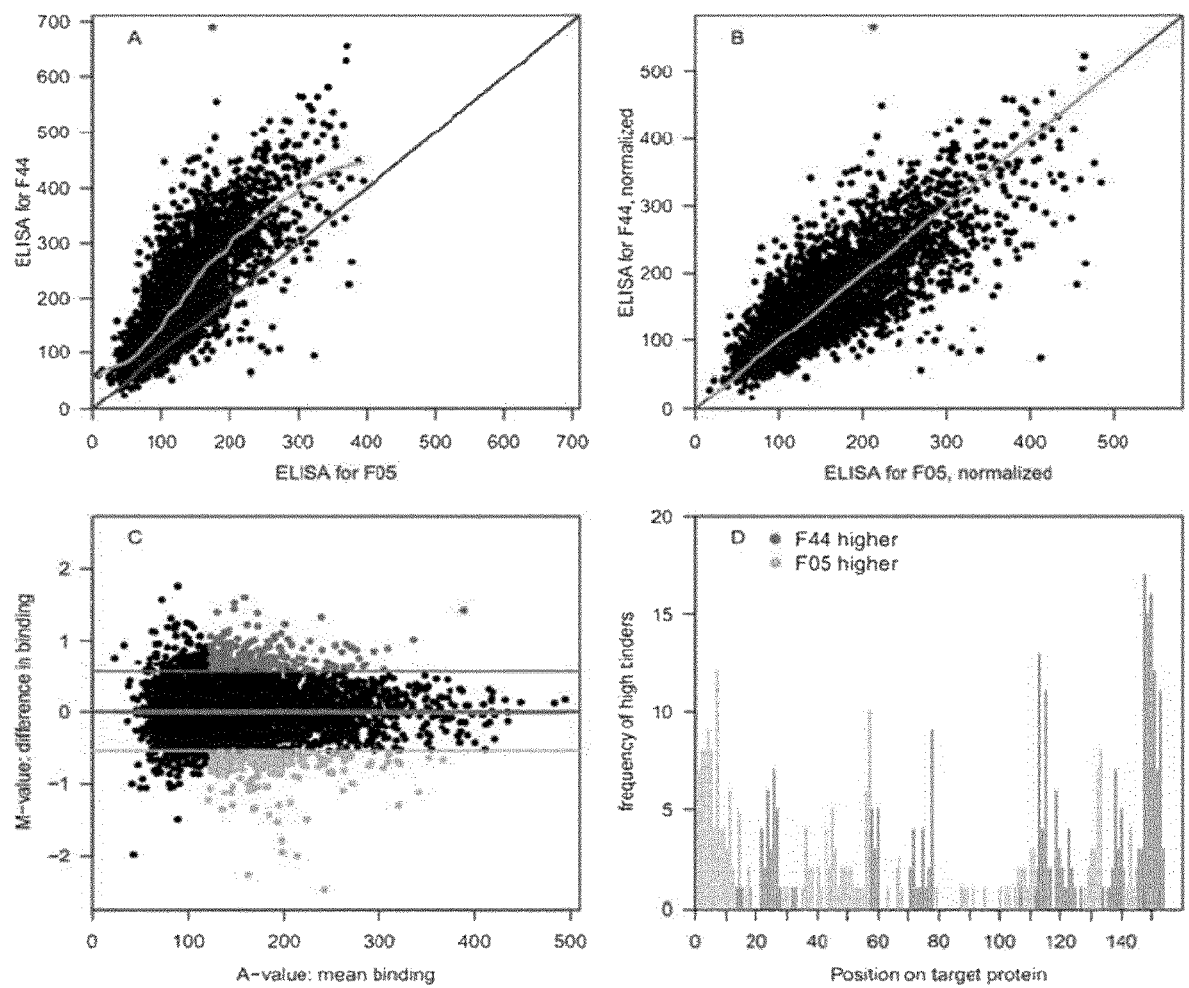
FIG. 6 shows analysis of binding differences between F44 and F05. (A) scatterplot of all ~4000 peptides within the CLIPS discontinuous matrix dataset. For each peptide, the ELISA value obtained for F05 and F44 was plotted as an XYscatter. Red line; 45° reference. Green line; LOESS spline fit. One data point was coloured magenta to trace over figures A-C. (B) LOESS normalized data obtained from fig A. (C) MA-plot of figure B. Datapoints above or below 0.5 and −0.5 are scored and coloured. (D) Frequency table of peptides scored in C. blue lines indicated higher binding for F44. Yellow lines indicate higher binding for F05.

In order to clarify binding differences among the two antibodies, the values from this data set were compared: each response value was plotted in a pair wise scatter plot. If for one peptide the binding is higher for one antibody in respect to the other, this point cloud would not be centred on a 1:1 line. As overall binding for F44 is higher than for F05, the point cloud in fact is not centred on a 1:1 line (see FIG. 6A). To adjust for overall binding and focus on specific differences between the two samples, the point cloud was normalized using a LOESS curve fit (see FIG. 6B). After normalization, the point cloud is centred around 1:1. To identify differentially binding peptides, the data from FIG. 6B is re-fitted into an MA-plot (a plot type which shows the mean value of two samples onto the X-axis, and the log 2 of the difference on the Y axis). On this plot, differentially binding peptides are those with a high Y-value. To remove noise, a cutoff for both mean and differential binding can be applied. The remaining differentially binding peptides are coloured blue (higher binding in F44) and yellow (higher binding in F05) in FIG. 6C. The identified 218 peptides (out of 4000) were scored according to sequence positions on the target protein (FIG. 6D). A clear increased binding for F44 is observed for peptides covering region 153-164. For F05, high relative binding is mainly observed for 7-21.

Both antibodies show strongest binding to region 21-27, suggesting this region is the epitope for both F05 and F44. However, secondary evidence shows that the two antibodies have different epitopes, as they can be used together in a 'sandwich-ELISA' experiment. Differential analysis between F05 and F44 suggests specific binding by F05 on the N-terminal domain and binding by F44 on the C-terminal domain. Both these domains are in vicinity of the dominant binding region.

Figure 7:
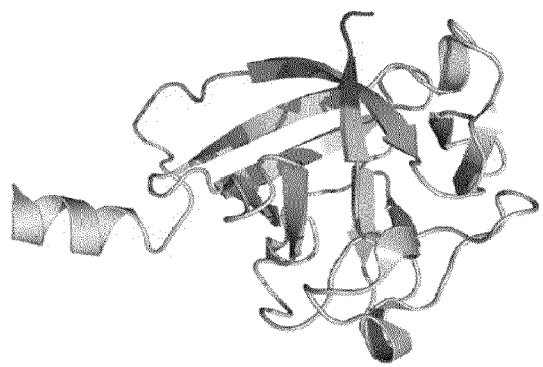
FIG. 7 shows visualization of binding areas onto structure of a homologue protein. 21-27 is coloured green. 7-21 is coloured yellow. 153-164 is coloured blue.

These results can be visualized as in FIG. 7, by using a protein belonging to the same family of Sprifermin.

The putative epitopes for F05 and F44 are therefore:
F05: 21-27 together with 7-21
F44: 21-27 together with 153-164

3. Development of a GYROLAB Based Assay for PK (Pharmaco-Kinetics) with Analyte and Matrix 3.1. Search for the Best Antibody Combination In order to determine the best antibody couple combination two different conditions were tested in a 3-step GYROLAB assay: "Bioaffy 1000 wiz v1 mod wash" with the addition of Wash Solution 2 (WS2: 1.5M NaCl in 20% Ethanol). A standard (std) curve of the analyte, Sprifermin, was prepared with independent dilutions in REXXIP HN buffer (Gyros, P0004996) at 50, 10, 2 ng/mL, 400, 80, 16, 3.2 pg/mL. A blank sample was added (Standard 0, "STD0", only REXXIP HN). The capture reagents (F44 and F05 antibodies, biotin labelled) were used at the concentration of 0.1 mg/mL. The detection reagent (alexa-647 labelled F44 and F05) were used at the concentration of 25 nM diluted in REXXIP F buffer (Gyros, P0004825).

Results

Figure 8:
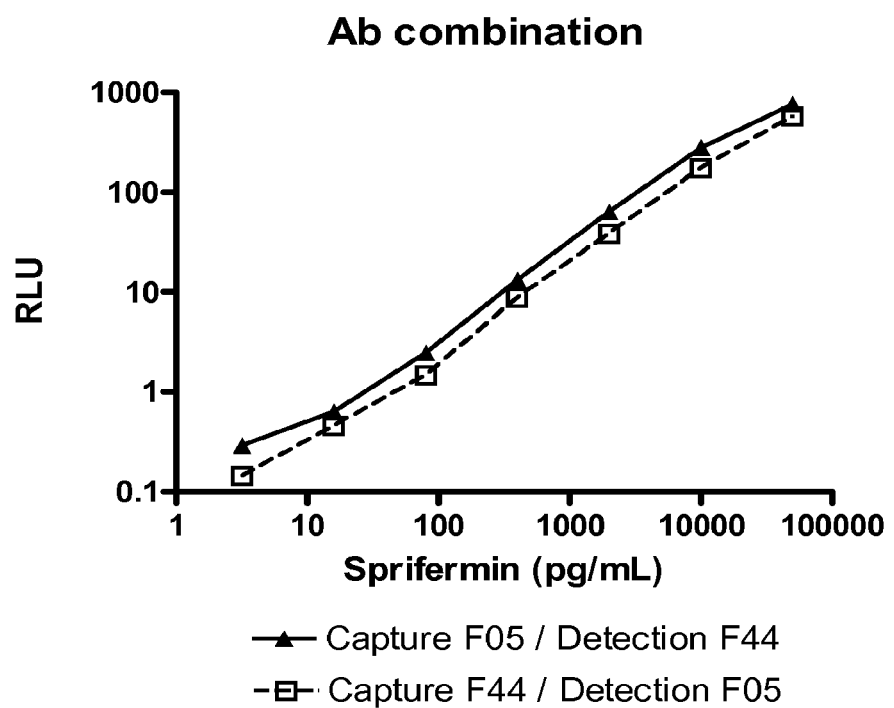
FIG. 8 shows graph of the log concentration of analyte vs average RLUs. Mean results of three replicates, error bars show SEM.

To decide the optimal antibody combination for this PK assay, the combinations of the two mAbs (F05 as capture/F44 as detection and F44 as capture/F05 as detection) were tested using a 3 step GYROLAB method "Bioaffy 1000 wiz v1 mod wash" with the addition of Wash Solution 2 (see FIG. 8). This experiment was repeated 3 times, also with variations in the detection antibody concentrations (data not shown). The best combination resulted to be the one with F44 as capture and F05 as detection: this binding arrangement produced peaks with a sharper shape and it showed to allow a better linearity also in the lower part of the curve (data not shown).

3.2. Choice of the Buffer

The choice of the buffer for the analyte dilution is crucial for the performance of the immunoassay. Four different buffers were used for the preparation of a standard curve of Sprifermin and analyzed according to the AlphaLISA technology procedure:

REXXIP HN buffer (Gyros, P0004996);
REXXIP HN MAX buffer (Gyros, P0004997);
Diluent buffer 1 (0.1% Bovine Serum Albumin (Sigma, cat. number A7906), 0.05% Lutrol (BASF cat. Number S30101) in 7 mM Na2HPO4, 1 mM KH2PO4, 2.7 mM KCl, pH 7.3);
Diluent buffer 10 (1% Bovine Serum Albumin (Sigma, cat. number A7906), 0.5% Lutrol (BASF cat. Number S30101) in 7 mM Na2HPO4, 1 mM KH2PO4, 2.7 mM KCl, pH 7.3).

STD curve was prepared at 20, 5, 1 ng/mL, 200, 50, 25, 10 pg/mL (final concentration in the well). A blank sample was added (STD0, only buffer). The capture reagent, F44 biotin labeled, was used at the concentration of 0.1 mg/mL. The detection reagent, alexa-647 labelled F05, was used at the concentration of 25 nM diluted in REXXIP F buffer (Gyros, P0004825).

Results

The best buffer resulted to be REXXIP HN, a commercial reagent containing agents to neutralize heterophilic antibodies, with an increased ionic strength for positively charged analytes, as Sprifermin is. The standard curve prepared in REXXIP HN had better accuracy (see Table 5) and precision (see Table 4) towards the other curves.

TABLE 4

Resuming table of the experiment for the buffer choice.

| Sprifermin nominal concentration pg/mL | REXXIP HN | | DB 10 | | DB 1 | | REXXIP HN MAX | |
|---|---|---|---|---|---|---|---|---|
| | AVG RLU | % CV | AVG RLU | % CV | AVG RLU | % CV | AVG RLU | % CV |
| 0 | 0.191 | 1.1 | 0.136 | 24.6 | 0.110 | 20.3 | 0.163 | 36.8 |
| 10 | 0.414 | 3.6 | 0.372 | 124.3 | 0.129 | 30.4 | 0.490 | 3.0 |
| 25 | 0.637 | 8.9 | 0.131 | 26.2 | 0.237 | 77.0 | 1.091 | 11.6 |
| 50 | 1.16 | 11.7 | 0.18 | 5.7 | 0.20 | 19.0 | 2.16 | 9.6 |
| 200 | 4.65 | 17.7 | 0.44 | 27.9 | 0.61 | 17.7 | 3.36 | 22.8 |
| 1000 | 20.9 | 5.5 | 2.1 | 30.9 | 2.4 | 13.7 | 16.2 | 9.3 |
| 5000 | 93.3 | 1.0 | 12.3 | 30.5 | 16.7 | 5.7 | 63.4 | 7.1 |
| 20000 | 329 | 2.6 | 67 | 34.0 | 84 | 7.4 | 237 | 11.9 |

AVG RLU: average response of three replicates, % CV: precision of three replicates.
Underlined: % CV out of the acceptance criteria (±20%)

TABLE 5

Resuming table of the experiment for the buffer choice.

| Sprifermin nominal concentration pg/mL | REXXIP HN | | DB 10 | | DB 1 | | REXXIP HN MAX | |
|---|---|---|---|---|---|---|---|---|
| | AVG BCC pg/mL | % BIAS | AVG BCC pg/mL | % BIAS | AVG BCC pg/mL | % BIAS | AVG BCC pg/mL | % BIAS |
| 10 | 11.2 | 12.0 | 253.5 | 2434.5 | 32.5 | 225.0 | 7.6 | −24.4 |
| 25 | 23.4 | −6.5 | 30.4 | 21.6 | 71.4 | 185.5 | 36.6 | 46.4 |
| 50 | 51.5 | 3.1 | 65.2 | 30.4 | 56.6 | 13.1 | 95.6 | 91.2 |

TABLE 5-continued

Resuming table of the experiment for the buffer choice.

| Sprifermin | REXXIP HN | | DB 10 | | DB 1 | | REXXIP HN MAX | |
|---|---|---|---|---|---|---|---|---|
| nominal concentration pg/mL | AVG BCC pg/mL | % BIAS | AVG BCC pg/mL | % BIAS | AVG BCC pg/mL | % BIAS | AVG BCC pg/mL | % BIAS |
| 200 | 207.5 | 3.8 | 217.0 | 8.5 | 242.0 | <u>21.0</u> | 168.7 | −15.7 |
| 1000 | 1043.7 | 4.4 | 1052.3 | 5.2 | 904.7 | <u>−9.5</u> | 1059.3 | 5.9 |
| 5000 | 4783.3 | −4.3 | 5423.3 | 8.5 | 5080.0 | 1.6 | 4963.3 | −0.7 |
| 20000 | 20366.7 | 1.8 | 16100.0 | −19.5 | 20250.0 | 1.3 | 20050.0 | 0.3 |

AVG BCC: average back calculated concentration of three replicates, % BIAS: accuracy of BCC.
Standard curve regressions were obtained using Xlfit (IDBS) logistic autoestimate weighted $1/y^2$.
formula 201.
Underlined: % BIAS out of the acceptance criteria (±20%)

3.3. Minimal Required Dilution (MRD)

Once the method has been optimized in buffer, it was translated in matrix. For this purpose an experiment was performed following the GYROLAB technology procedure. The standard curve prepared in REXXIP HN was used to quantify the analyte prepared in Pooled human Synovial fluid (Sera Laboratories International) at the following concentrations: 0.5, 1, 2, 5 and 10 ng/mL and then diluted respectively 1:5, 1:10, 1:20, 1:50, 1:100. In parallel blank matrix was were treated in the same way before testing.

Results

Figure 9:
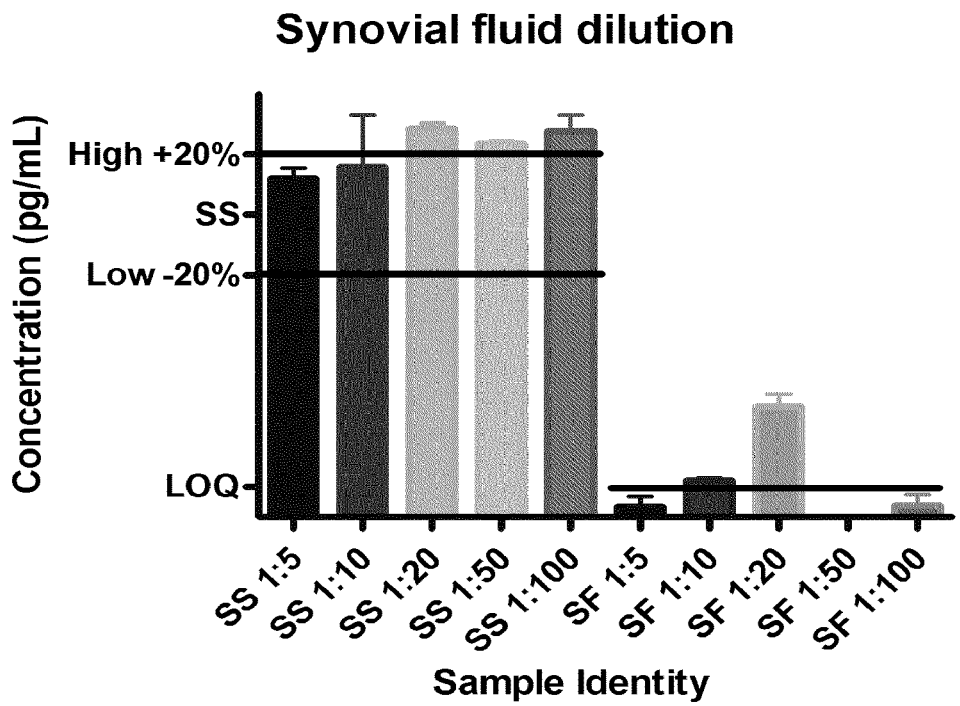
FIG. 9 shows histogram representing the result of BCC of spiked samples (SS) and Synovial fluid blank samples (SF) with various MRD. Average of 3 replicates, error bars represent SEM.

In order to set the MRD to be applied for samples testing, samples prepared in pooled human synovial fluid were analysed against a standard-curve prepared in REXXIP HN. Performing the first experiment using synovial fluid, the matrix resulted to be very viscous and difficult to pipette, moreover, due to the high viscosity it could also cause needle clotting. For these reasons the result of the experiments performed to find the MRD were not satisfying in terms of accuracy and precision: the % CV was high for the 1:10 dilution (see Table 6 and FIG. 9), and the % BIAS was acceptable for lower MRD (1:5 and 1:10) but not for high dilutions. For this reason, it was decided to improve the handling of synovial fluid by adding a step of pre-treatment of the matrix before the MRD

3.4. Matrix Pre-Treatment

In order to reduce matrix viscosity a centrifugation step and a digestion with hyaluronidase were set up.

3.4.1. Hyaluronidase Digestion

A stock solution of Hyaluronidase (Hyaluronidase Type from Bovine Testes Sigma, H3506) was diluted in PBS containing 0.01% BSA at the concentration of 200 and 2 μg/mL. These solutions were added to three samples: 1) blank synovial fluid, 2) synovial fluid with the addition of the analyte at 1000 pg/mL (final concentration 100 pg/mL), and 3) synovial fluid with the addition of the analyte at 200 pg/mL (final concentration 40 pg/mL). These samples were incubated for 30 minutes at RT in shaking. At the end of the incubation the samples were diluted 1:5 or 1:10 in REXXIP HN, and analyzed according to the procedure described in paragraph 3.1.

Results

As shown in Table 7, an improvement of the results by digesting synovial fluid with hyaluronidase is obtained only for the 1:5 dilution both for blank and spiked samples. Among the two concentrations of Hyaluronidase tested, the best is 10 μg/mL. This treatment produced a very low % bias for the spiked sample, but the real improvement regards the blank samples, almost all the treated samples resulted to be BQL, in contrast to the previous results shown (see Table 6).

TABLE 6

Resuming table of the experiment for the MRD.

| | MRD 1:5 | MRD 1:10 | MRD 1:20 | MRD 1:50 | MRD 1:100 |
|---|---|---|---|---|---|
| Spiked SF pool (final concentration 100 pg/mL) (Acc. Criteria: % BIAS ± 20%) | | | | | |
| AVG BCC pg/mL | 112.0 | 115.9 | 128.7 | 123.7 | 127.7 |
| % BIAS | 12.0 | 15.9 | <u>28.7</u> | <u>23.7</u> | <u>27.7</u> |
| % CV | 5.4 | <u>25.6</u> | 2.5 | 1.2 | 7.1 |
| Blank SF pool, acceptance criteria: all BQL | | | | | |
| replica 1 BCC pg/mL | BQL | <u>13.4</u> | <u>44.8</u> | BQL | <u>11</u> |
| replica 2 BCC pg/mL | <u>10</u> | <u>10.8</u> | <u>30.1</u> | BQL | BQL |
| replica 3 BCC pg/mL | BQL | <u>11.6</u> | <u>34.5</u> | BQL | BQL |

AVG BCC: average back calculated concentration of three replicates, % BIAS: accuracy of BCC.
% CV: precision of three replicates.
BQL = Below low limit of quantification.
Standard curve regression was obtained using Xlfit (IDBS) logistic autoestimate weighted $1/y^2$.
formula 201.
Underlined: results out of the acceptance criteria

TABLE 7

Resuming table of the experiment for the synovial fluid digestion.

| SF blank samples diluted 1:10 Acc. Criteria: all BQL | | | SS 1000 pg/mL in neat SF, diluted 1:10 (final in well conc. 100 pg/mL) Acc. Criteria: BIAS % ±20 | | | |
|---|---|---|---|---|---|---|
| No treatment | Hyal. 0.1 µg/mL | Hyal. 10 µg/mL | No treatment | Hyal. 0.1 µg/mL | Hyal. 10 µg/mL | |
| BQL | 11.4 | BQL | 183 | 150 | 158 | replica 1 BCC pg/mL |
| BQL | BQL | BQL | 189 | 153 | 186 | replica 2 BCC pg/mL |
| 21.5 | BQL | BQL | 188 | 163 | 173 | replica 3 BCC pg/mL |
| | | | 186.7 | 155.3 | 172.3 | AVG BCC pg/mL |
| | | | 86.7 | 55.3 | 72.3 | % BIAS |

| SF blank samples diluted 1:5 Acc. Criteria: all BQL | | | SS 200 pg/mL in neat SF, diluted 1:5 (final in well conc. 40 pg/mL) Acc. Criteria: BIAS % ±20 | | | |
|---|---|---|---|---|---|---|
| No treatment | Hyal. 0.1 µg/mL | Hyal. 10 µg/mL | No treatment | Hyal. 0.1 µg/mL | Hyal. 10 µg/mL | |
| 11 | BQL | BQL | 64.4 | 66.1 | 39.5 | replica 1 BCC pg/mL |
| 16.6 | BQL | BQL | 65.5 | 46 | 43.4 | replica 2 BCC pg/mL |
| BQL | BQL | BQL | 55.6 | BQL | 42.7 | replica 3 BCC pg/mL |
| | | | 61.8 | 56.1 | 41.9 | AVG BCC pg/mL |
| | | | 54.6 | 40.1 | 4.7 | % BIAS |

0.01% BSA = samples treated with no hyaluronidase, Hyal 0.1 µg/mL = samples treated with the lower concentration of hyaluronidase, Hyal 10 µg/mL = samples treated with the higher concentration of hyaluronidase.
AVG BCC: average back calculated concentration of three replicates, % BIAS: accuracy of BCC.
BQL= Below low limit of quantification.
Standard curve regression was obtained using Xlfit (IDBS) logistic autoestimate weighted $1/y^2$.
Formula 201.
Underlined: results out of the acceptance criteria

3.4.2. Centrifugation

Three spiked samples containing the analyte were prepared using pooled human synovial fluid at the concentrations of 75, 2.5 and 0.15 ng/mL (final concentration in well, respectively, 15000, 500 and 30 pg/mL) and were centrifuged twice at 13000 rpm for 5 minutes. After the centrifugation, samples were diluted 1:5 in REXXIP HN, and analyzed using a standard curve prepared in REXXIP HN buffer (Gyros, P0004996) at 20, 10, 5, 1 ng/mL, 200, 50, 20 pg/mL (final concentrations in well). A blank sample was added (STD0, only REXXIP HN). A blank matrix was processed in the same way. The run was performed following the AlphaLISA technology procedure.

Results

As shown in Table 8, the centrifugation steps didn't ameliorate the % BIAS of the spiked samples analyzed after the selected MRD 1:5. All the samples were overestimated, however, samples after centrifugation were easier to handle than samples only treated with hyaluronidase. For this reason it was decided to combine the two pre-treatments.

TABLE 8

Resuming table of the experiment for the synovial fluid centrifugation.

| SF BLANK | SS 30 pg/mL | SS 500 pg/mL | SS 15000 pg/mL | |
|---|---|---|---|---|
| BQL | 34.1 | 748 | ALQ | replica 1 BCC pg/mL |
| BQL | 53.4 | 723 | ALQ | replica 2 BCC pg/mL |
| BQL | 44.3 | 931 | ALQ | replica 3 BCC pg/mL |
| n.a. | 43.9 | 800.7 | n.a. | AVG BCC pg/mL |
| n.a. | 46.4 | 60.1 | n.a. | % BIAS |

AVG BCC: average back calculated concentration of three replicates, % BIAS: accuracy of BCC.
BQL = below low limit of quantification.
ALQ = Above limit of quantification.
Standard curve regression was obtained using Xlfit (IDBS) logistic autoestimate weighted $1/y^2$.
Formula 201.

3.4.3. Hyaluronidase Digestion+Centrifugation

Three spiked samples and a blank sample were prepared using human synovial fluid pool at the concentrations of 75, 2.5 and 0.15 ng/mL (final concentration in well, respectively, 1500, 500 and 30 pg/mL) and were centrifuged twice at 13000 rpm for 5 minutes. A solution of 200 pg/mL of hyaluronidase in PBS containing 0.01% BSA was diluted 1:20 in these spiked samples and incubated for 30' at RT in shaking. At the end of the incubation the samples were diluted 1:5 in REXXIP HN, and analyzed using a standard curve prepared in REXXIP HN buffer (Gyros, P0004996) at 20, 10, 5, 1 ng/mL, 200, 50, 20 pg/mL (final concentrations in well). A blank sample was added (STD0, only REXXIP HN). A blank matrix was processed in the same way. The run was performed following the AlphaLISA technology procedure.

Results

The combination of centrifugation plus enzymatic digestion gave better results for all the concentrations tested except the low SS which was not quantifiable (below 20 pg/mL, which was the lowest standard curve point; see table 9). At this point the selected pre-treatment was the following:

Centrifugation of the sample twice at 13'000 rpm for 5 minutes;
Hyaluronidase digestion: 30' RT in shaking with 10 µg/mL of Hyaluronidase
MRD 1:5 in REXXIP HN

TABLE 9

Resuming table of the experiment for the synovial fluid double treatment.

| SF BLANK | SS 30 pg/mL | SS 500 pg/mL | SS 15000 pg/mL | |
|---|---|---|---|---|
| BQL | BQL | 585 | 18100 | replica 1 BCC pg/mL |
| BQL | BQL | 602 | 13500 | replica 2 BCC pg/mL |
| BQL | BQL | 561 | 16500 | replica 3 BCC pg/mL |
| n.a. | n.a. | 583 | 16033 | AVG BCC pg/mL |
| n.a. | n.a. | 16.5 | 6.9 | % BIAS |

AVG BCC: average back calculated concentration of three replicates, % BIAS: accuracy of BCC.
BQL = below low limit of quantification.
Standard curve regression was obtained using Xlfit (IDBS) logistic autoestimate weighted 1/y².
Formula 201.

3.4.4. Impact of the Treatment on the Analyte

Three quality controls in buffer were prepared at the concentrations of 150, 1500 and 75,000 pg/mL (final concentrations respectively, 30, 300, 15,000 pg/mL). Half of the preparation was diluted 1:5 in REXXIP HN, and the other half was incubated for 30' at 22° C. with 10 µg/mL hyaluronidase.

Results

Figure 10:
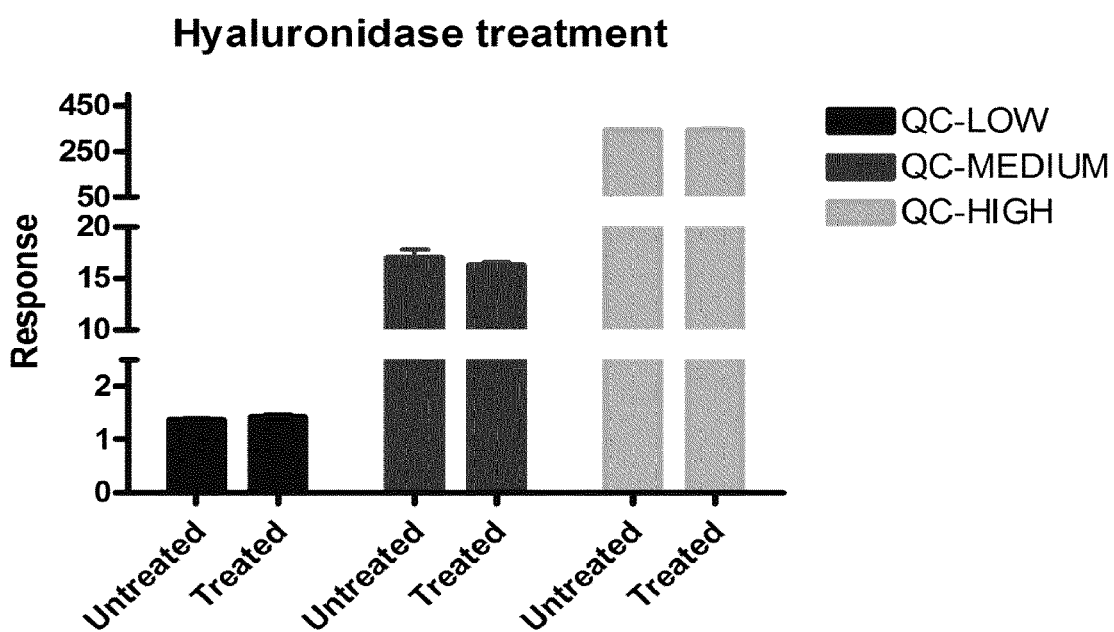
FIG. 10 shows histogram representing the result of mean RLU of QC samples prepared in REXXIP HN at three level of concentration (QC-Low=30 µg/mL, QC-Medium=500 µg/mL, QC-High=15000 µg/mL) With (treated) or without (untreated) hyaluronidase digestion. Average of 3 replicates, error bars represent SEM.

In order to verify if sample pre-treatment could harm Sprifermin, three quality controls were analysed with or without sample pretreatment. Results indicated that the hyaluronidase digestion doesn't impact the analyte, RLUs obtained from the treated and untreated QCs are comparable. (see Table 10 and FIG. 10)

TABLE 10

Resuming table of the results.

| | untreated RLU | treated RLU |
|---|---|---|
| QC-LOW | 1.42 | 1.49 |
| | 1.34 | 1.42 |
| | 1.38 | 1.36 |
| QC-MEDIUM | 17.7 | 16.7 |
| | 17.9 | 16.5 |
| | 15.5 | 15.8 |
| QC_HIGH | 351 | 332 |
| | 338 | 337 |
| | 341 | 358 |

RLU of the QC samples prepared in Rexxip HN at three level of concentration (QC-Low = 30 pg/mL, QC-Medium = 500 pg/mL, QC_High = 15000 pg/mL) With (treated) or without (untreated) hyaluronidase digestion.

3.4.5. Matrix Pre-Treatment: Optimization and Selectivity Evaluation

The experiment to assess method selectivity was performed by using 9 individual human synovial fluid samples. A stock solution of Hyaluronidase was prepared in PBS 0.01% BSA at the concentration of 400 µg/mL and added (1:20 dilution) to the 9 individual synovial fluid samples. Samples were incubated for 30 minutes at RT in shaking and then centrifuged twice at 13000 rpm for 5 minutes. After matrix pre-treatment Sprifermin was added to each of the 9 samples at the concentration of 100 pg/mL (LLOQ) and diluted 1:5 in REXXIP HN according to the AlphaLISA technology procedure.

Results

After having tested some individual human synovial fluid samples, it was decided to raise the concentration of hyaluronidase to 20 µg/mL and to postpone the centrifugation steps afterwards. This was done because synovial fluid from different individuals did not result clear in all cases (data not shown). As shown Table 11, 9 out of 10 samples had mean % BIAS within ±25%. The acceptance criteria for selectivity is: at least 80% of individual samples spiked at the LLOQ concentration must have % BIAS of ±25%. Therefore the acceptance criteria is met.

TABLE 11

Resuming table of the results.

| Individual Spiked Samples at 100 pg/mL | AVERAGE BCC ng/mL | mean BIAS % of each conc. | % CV |
|---|---|---|---|
| Sample 1 | 22.6 | 13.0 | 6.3 |
| Sample 2 | 20.0 | −0.1 | 16.5 |
| Sample 3 | 22.5 | 12.3 | 6.7 |
| Sample 4 | 31.9 | 59.6 | 21.1 |
| Sample 5 | 20.8 | 4.2 | 15.1 |
| Sample 6 | 17.9 | −10.5 | 4.7 |
| Sample 7 | 15.5 | −22.3 | 3.9 |
| Sample 8 | 17.8 | −11.0 | 11.5 |
| Sample 9 | 20.9 | 4.5 | 2.9 |
| Sample 10 | 15.4 | −22.8 | 16 |

BCC = Back calculated concentrations of individual synovial fluid samples spiked at the LLOQ concentration (100 pg/mL, final concentration 20 pg/mL) average of 3 replicates.
% BIAS: accuracy of BCC.
% CV = precision of BCC.
Underlined: % CV or % bias out of the acceptance criteria (±25%)

3.5. Carryover Assessment and GYROLAB Method Optimization

In order to assess the presence of a carryover effect, a custom run using the custom method "Bioaffy 1000 v1 mod wash" with the addition of Wash Solution 2 (WS2: 1.5M NaCl in 20% Ethanol) was performed. The following preparations were done: 1) a standard curve prepared by diluting Sprifermin at the following concentrations: 20, 10, 5, 1 ng/mL, 200, 50, 20 pg/mL in REXXIP HN; 2) QC at 20 ng/mL in REXXIP HN; 3) blank sample prepared with only REXXIP HN.

The run was set up in order to make each of the 8 needle load
1. A blank sample first;
2. One standard curve point;
3. A 20 ng/mL QC sample;
4. A blank sample at the end.

Capture and detection reagents were used at the concentrations already defined.

Results

As the GYROLAB is a robotic system in which samples are handled using a fixed set of needles, the possibility of a carryover effect must be excluded by performing a specific assessment. For this purpose an experiment was set up, to make each needle load a blank sample, then an high concentrated std and then a blank sample afterwards. All the blanks before and after the high concentration QC gave concentrations BQL (see Table 12), however there was an increase in the average response between the before and after, indicating the possible presence of a carryover, even if at low effect.

TABLE 12

Result of the carryover assessment.

| | BLK before (RLU) | High QC (RLU) | BLK after (RLU) |
|---|---|---|---|
| Needle 1 | 0.118 | 230 | 0.234 |
| | 0.100 | 236 | 0.223 |
| | <u>0.715</u> | 243 | 0.366 |
| Needle 2 | 0.079 | 232 | 0.248 |
| | 0.038 | 234 | 0.199 |
| | 0.084 | 257 | 0.205 |
| Needle 3 | 0.084 | 231 | 0.332 |
| | 0.068 | 244 | 0.279 |
| | 0.069 | 244 | 0.305 |
| Needle 4 | 0.038 | 236 | 0.231 |
| | 0.061 | 246 | 0.369 |
| | 0.060 | 236 | 0.435 |
| Needle 5 | 0.058 | 242 | 0.224 |
| | 0.062 | 254 | 0.188 |
| | 0.063 | 249 | 0.232 |
| Needle 6 | 0.081 | 224 | 0.318 |
| | 0.057 | 233 | 0.361 |
| | 0.083 | 233 | 0.467 |
| Needle 7 | 0.066 | 252 | 0.272 |
| | 0.016 | 241 | 0.240 |
| | 0.042 | 252 | 0.294 |
| Needle 8 | 0.109 | 254 | 0.468 |
| | 0.091 | 229 | 0.434 |
| | 0.089 | 220 | 0.452 |
| average RLU | 0.10 | 240 | 0.31 |
| % CV | 137.7 | 4.2 | 29.8 |

RLU of blank before, high QC and blank after are reported for each needle.
Averaged data are presented for each sample.
The STD. 1 RLU at the limit of quantification was 0.655.
Underlined: outlier 3.5.1. Impact on LLOQ Samples In order to assess if the slight carryover observed in the previous experiment could have an impact on samples at the LLOQ concentrations. The same assessment was performed by substituting the blank samples with pooled synovial fluid spiked samples at the LLOQ concentration (100 pg/mL, final concentration in well 20 pg/mL).

The run was set up in order to make each of the 8 needle load:

1. A LLOQ sample first;
2. One standard curve point;
3. A 20 ng/mL QC sample;
4. A LLOQ sample at the end.

The same method used in the previous experiment was used to test a LLOQ sample before and after a high concentration sample and a modified method with only minor changes of the needle washing procedure was also evaluated. An additional step of needle wash with WS2 solution was added before and after the step of analyte addition. Moreover, during the analyte addition step, an additional wash was added, this modified method was called "Bioaffy 1000 wash station 2 v2 beta1".

Results

To better understand the impact of this behaviour on samples, the same assessment for repeated substituting the blank samples with samples containing the analyte at the concentration of the LLOQ. A real impact on lower concentrations samples, see Table 13, was observed confirming the potential presence of a carryover effect.

TABLE 13

Result of the carryover assessment.

| | LLOQ before (BCC pg/mL) | LLOQ after (BCC pg/mL) |
|---|---|---|
| Needle 1 | 119.2 | 142.2 |
| | 114.4 | <u>132.9</u> |
| | 106.6 | <u>139.0</u> |
| Needle 2 | 117.3 | <u>134.7</u> |
| | 115.1 | <u>132.4</u> |
| | <u>132.6</u> | 119.4 |
| Needle 3 | <u>119.2</u> | 155.0 |
| | 119.8 | <u>133.6</u> |
| | 103.3 | <u>133.0</u> |
| Needle 4 | 99.9 | <u>134.4</u> |
| | <u>120.1</u> | <u>136.5</u> |
| | <u>132.4</u> | <u>146.4</u> |
| Needle 5 | <u>113.8</u> | <u>132.4</u> |
| | 113.5 | <u>122.4</u> |
| | 115.3 | <u>131.0</u> |
| Needle 6 | 123.2 | <u>148.8</u> |
| | <u>120.1</u> | <u>145.9</u> |
| | <u>121.8</u> | <u>152.4</u> |
| Needle 7 | <u>123.4</u> | <u>139.3</u> |
| | <u>102.1</u> | <u>126.6</u> |
| | 115.6 | <u>135.4</u> |
| Needle 8 | 126.1 | <u>158.4</u> |
| | <u>97.0</u> | <u>142.9</u> |
| | 105.6 | <u>139.2</u> |
| average BCC | 115.73 | <u>138.09</u> |
| % CV | 8.1 | 7.0 |
| Needle 1 | 115.1 | 101.4 |
| | 105.4 | 109.3 |
| | 86.2 | 110.9 |
| Needle 2 | 94.5 | 113.5 |
| | <u>68.9</u> | 95.0 |
| | <u>86.9</u> | 95.6 |
| Needle 3 | 99.8 | <u>126.4</u> |
| | 97.7 | 97.0 |
| | 97.3 | 98.7 |
| Needle 4 | 110.5 | 111.8 |
| | 106.1 | 111.4 |
| | 114.6 | 116.7 |
| Needle 5 | 97.5 | 113.7 |
| | 105.4 | 94.0 |
| | 88.3 | 86.9 |

Back Calculated Concentration (pg/mL) of LLOQ before and LLOQ after are reported for each needle.
Averaged data are presented for each sample.
The acceprtance criteris for the concentration is between 75 and 125 pg/mL.
Underlined: concentration out of the acceptance criteria (100 ± 25%)

TABLE 14

Result of the carryover assessment.
Back Calculated Concentration (pg/mL) of LLOQ before and LLOQ after are reported for each needle. Average data are presented for each sample. The acceptance criteria for the concentration is between 75 and 125 pg/mL.

| Needle 6 | 104.2 | 109.3 |
|---|---|---|
| | <u>137.8</u> | 107.4 |
| | <u>113.2</u> | 114.2 |
| Needle 7 | <u>191.7</u> | 118.6 |
| | <u>98.2</u> | 100.7 |
| | 107.0 | 89.2 |

TABLE 14-continued

Result of the carryover assessment.
Back Calculated Concentration (pg/mL) of
LLOQ before and LLOQ after are reported for
each needle. Average data are presented for
each sample. The acceptance criteria for the
concentration is between 75 and 125 pg/mL.

| Needle 8 | 120.9 | 121.1 |
|---|---|---|
|  | 109.3 | 103.3 |
|  | 116.0 | 132.5 |
| average BCC | 107.19 | 107.44 |
| % CV | 21.1 | 10.8 |

Underlined: concentration out of the acceptance criteria (100 ± 25%)

On the contrary, when the needle washing procedure was improved, the impact on the low concentrated sample was very limited (see Table 14), confirming the accuracy of the optimized method to quantify real synovial fluid samples at very low concentrations.

3.6. Final method
3.6.1. Summary

A biotinylated mouse monoclonal antibody against Sprifermin is used as capture reagent (F44), and an Alexa Fluor-647 labelled monoclonal antibody against Sprifermin is used as detection reagent (F05). The calibration standards and quality controls are prepared in REXXIP HN. Unknown samples are analysed after pre-treatment with a minimal dilution of 1:5 in REXXIP HN. The method range is from 150 pg/mL to 50,000 pg/mL and is further extended up to 9.6 μg/mL with dilution using REXXIP HN. Calibration curve points: 10,000, 5,000, 1000, 200, 100, 50, 30, 0 pg/mL. Quality Controls: QC-H: 7,000 pg/mL, QC-M: 500 pg/mL, QC-L: 90 pg/mL.

3.6.2. Unknown Samples Pretreatment:

Treat unknown samples with 20 μg/mL of Hyaluronidase solution. Add Hyaluronidase to the unknown sample (e.g. 2 μL of Hyaluronidase 400 μg/mL to 38 μL of unknown sample), vortex and incubate for 30 minutes at 22° C. in shaking. Centrifuge the unknown samples at 13,000 rpm for 10 minutes using a minispin centrifuge. Dilute treated unknown samples 1:5 with REXXIP HN before analysis (e.g. 4 μL unknown sample+16 μL REXXIP HN).

3.6.3. Antibodies Preparation

Coating antibody must be diluted at 0.1 mg/mL in PBS-T, if it is not ready to use. Detection antibody must be diluted in REXXIP F at 20 nM and kept protected from light.

3.6.4. Procedure

1. Bring all reagents at room temperature before analysis
2. Put GYROLAB in stand-by mode, turn off GYROLAB control software and the instrument, and perform internal wash station cleaning with milliQ water
3. Turn on the instrument and GYROLAB control software, initialize and prime the system with PBS-T as described in the User Guide
4. Perform needle desorb as described in the User Guide using WS2 once a week.
5. Connect the WS2 solution to the Wash station 2 and prime the system as described in the User Guide
6. Create a new run using the 3-steps wizard method: "Bioaffy 1000 PBTM-087_PMT 5". Calibration standards and quality controls must be assayed in triplicate while sample in single replica.
7. Add calibration standards, quality controls, unknown samples, capture and detection antibodies and wash buffer to the microplate according to the GYROLAB control loading list. Cover with a microplate lid and protect from light
8. Load microplates and CDs as required by the instrument assisted loading procedure and start the run.

Use triplicate of each STD solution. Do not include STD-0 in the regression analysis.

Fit the standard curve with a logistic (auto-estimate, weighting factor $1/Y^2$) equation using the instrument response of each replicate of each calibration standard It is possible to dilute some unknown samples before analysis if evidences suggest that these samples have concentrations above upper limit of quantitation (50,000 pg/mL). Perform the dilution using REXXIP HN starting from the initial samples diluted at minimal dilution (1:5). However, it should be documented.

If an actual sample concentration is below the lower limit of quantitation of the method (150 pg/mL), it will be reported as below lower limit of quantitation (BQL).

The invention claimed is:

1. A method for quantification of a highly positively charged protein in a human synovial fluid sample comprising the steps of:
   a) pre-treating the human synovial fluid sample, the pre-treating step comprising adding hyaluronidase solution to the human synovial fluid sample, incubating said sample at room temperature (RT), and centrifuging the human synovial fluid sample;
   b) diluting the pre-treated human synovial fluid sample with a buffer;
   c) immobilizing a biotinylated antibody against the highly positively charged protein to a column;
   d) washing the column to remove unbound antibody with a standard wash buffer;
   e) contacting in the column the pre-treated and diluted human synovial fluid sample with the immobilized biotinylated antibody under conditions in which the antibody binds specifically to the highly positively charged protein, to produce an antibody-protein complex;
   f) washing the column with a standard wash buffer;
   g) adding to the antibody-protein complex in the column a fluorescent dye-labelled antibody specific for the highly positively charged protein to produce a measurable response, and washing the column with a standard wash buffer;
   h) measuring the response produced; and
   i) determining a quantity of highly positively charged protein in the sample by comparing the response produced with the sample to the response produced with a calibration standard;
   wherein the highly positively charged protein in the sample is fibroblast growth factor 18 (FGF-18) having an isoelectric point at or above 9.5, and
   wherein the FGF-18 protein is selected from the group consisting of: a) a polypeptide comprising the amino acid residues 28-207 of SEQ ID NO: 1, b) a polypeptide comprising the amino acid residues 28-196 of SEQ ID NO: 1, and c) a polypeptide comprising SEQ ID NO: 2.

2. The method according to claim 1, wherein the incubating time of step a) is 1 h.

3. The method according to claim 1, wherein the FGF-18 protein is sprifermin.

4. A method for automatic quantification of a highly positively charged protein in a human synovial fluid sample comprising the steps of:
   a) pre-treating the human synovial fluid sample, the pre-treating step comprising adding hyaluronidase solution to the human synovial fluid sample, incubating said sample at room temperature (RT), and centrifuging the human synovial fluid sample;
   b) diluting the pre-treated human synovial fluid sample with a buffer;
   c) immobilizing a biotinylated antibody against the highly positively charged protein to a column;
   d) washing the column to remove unbound antibody with a standard wash buffer;
   e) providing an injection means for automatic transfer of the pre-treated and diluted human synovial fluid sample to the column;
   f) washing the injection means with a high ionic force buffer that is 1.5M NaCl in 20% ethanol before the pre-treated and diluted human synovial fluid sample is transferred to the column;
   g) transferring the pre-treated and diluted human synovial fluid sample to the column, thereby contacting the pre-treated and diluted human synovial fluid sample with the immobilized biotinylated antibody under conditions in which the antibody binds specifically to the highly positively charged protein, to produce an antibody-protein complex;
   h) washing the injection means with the high ionic force buffer after the step g);
   i) washing the column with a standard wash buffer;
   j) adding to the antibody-protein complex in the column a fluorescent dye-labelled antibody specific for the highly positively charged protein to produce a measurable response, and washing the column a standard wash buffer;
   k) measuring the response produced; and
   l) determining a quantity of the highly positively charged protein in the sample by comparing the response produced with the sample to the response produced with a calibration standard;
   wherein the highly positively charged protein in the sample is fibroblast growth factor 18 (FGF-18) having an isoelectric point at or above 9.5, and
   wherein the FGF-18 protein is selected from the group consisting of: a) a polypeptide comprising the amino acid residues 28-207 of SEQ ID NO:1, b) a polypeptide comprising the amino acid residues 28-196 of SEQ ID NO:1, and c) a polypeptide comprising SEQ ID NO:2.

5. The method according to claim 4, wherein the human synovial fluid sample is part of a set of human synovial fluid samples to be analyzed.

6. The method according to claim 4, wherein the column of step c) is one column in a set of columns.

7. The method according to claim 4, wherein all the steps are repeated as often as needed to automatically quantify a high positively charged protein in a set of human synovial fluid samples to be analyzed.

8. The method according to claim 4, wherein the incubating time of step a) is 1 h.

9. The method according to claim 4, wherein the FGF-18 protein is sprifermin.

* * * * *

SEQUENCE LISTING

```
Sequence total quantity: 2
SEQ ID NO: 1           moltype = AA  length = 180
FEATURE                Location/Qualifiers
source                 1..180
                       mol_type = protein
                       organism = Homo sapiens
SEQUENCE: 1
EENVDFRIHV ENQTRARDDV SRKQLRLYQL YSRTSGKHIQ VLGRRISARG EDGDKYAQLL   60
VETDTFGSQV RIKGKETEFY LCMNRKGKLV GKPDGTSKEC VFIEKVLENN YTALMSAKYS  120
GWYVGFTKKG RPRKGPKTRE NQQDVHFMKR YPKGQPELQK PFKYTTVTKR SRRIRPTHPA  180

SEQ ID NO: 2           moltype = AA  length = 169
FEATURE                Location/Qualifiers
source                 1..169
                       mol_type = protein
                       organism = Homo sapiens
SEQUENCE: 2
EENVDFRIHV ENQTRARDDV SRKQLRLYQL YSRTSGKHIQ VLGRRISARG EDGDKYAQLL   60
VETDTFGSQV RIKGKETEFY LCMNRKGKLV GKPDGTSKEC VFIEKVLENN YTALMSAKYS  120
GWYVGFTKKG RPRKGPKTRE NQQDVHFMKR YPKGQPELQK PFKYTTVTK            169
```